United States Patent [19]

Lasher et al.

[11] Patent Number: 4,863,247

[45] Date of Patent: Sep. 5, 1989

[54] OPTICAL ARITHMETIC LOGIC USING THE MODIFIED SIGNED-DIGIT REDUNDANT NUMBER REPRESENTATION

[75] Inventors: Mark E. Lasher; Richard P. Bocker; Barry L. Drake; Thomas B. Henderson, all of San Diego, Calif.

[73] Assignee: The United States of America as represented by the Secretary of the Navy, Washington, D.C.

[21] Appl. No.: 209,146

[22] Filed: Jun. 16, 1988

Related U.S. Application Data

[62] Division of Ser. No. 947,142, Dec. 29, 1986, Pat. No. 4,838,646.

[51] Int. Cl.[4] .......................... G06F 7/56; G02B 5/30

[52] U.S. Cl. .................................. 350/401; 350/370; 364/713

[58] Field of Search ............... 350/370, 400, 401, 172, 350/174; 364/713

[56] References Cited

U.S. PATENT DOCUMENTS 4,811,258 3/1989 Andersen et al. .................. 364/713

FOREIGN PATENT DOCUMENTS 0574718 9/1977 U.S.S.R. ............................ 364/713

OTHER PUBLICATIONS

Simizu et al.; "Multi-Layered Interative Optronic Adder-Subtracter Circuit".

*Primary Examiner*—Bruce Y. Arnold
*Assistant Examiner*—Terry S. Callaghan
*Attorney, Agent, or Firm*—Harvey Fendelman; Thomas Glenn Keough

[57] ABSTRACT

Optical architectures are presented for performing fully parallel, carry-free computation with a trinary, modified signed-digit number representation to allow addition, subtraction and multiplication. Two different optical schemes involving position and polarization encoding enable the fabrication of modular trinary logic systems that accommodate trinary numbers of different magnitudes. The optical systems made up of redundant three-dimensional modules provide a designer with latitude to simultaneously carry out addition, subtraction or multiplication optically and with reduced complexity.

10 Claims, 13 Drawing Sheets

T

| | 1 | 0 | $\bar{1}$ |
|---|---|---|---|
| 1 | 1 | 1 | 0 |
| 0 | 1 | 0 | $\bar{1}$ |
| $\bar{1}$ | 0 | $\bar{1}$ | $\bar{1}$ |

W

| | 1 | 0 | $\bar{1}$ |
|---|---|---|---|
| 1 | 0 | $\bar{1}$ | 0 |
| 0 | $\bar{1}$ | 0 | 1 |
| $\bar{1}$ | 0 | 1 | 0 |

T'

| | 1 | 0 | $\bar{1}$ |
|---|---|---|---|
| 1 | 1 | 0 | 0 |
| 0 | 0 | 0 | 0 |
| $\bar{1}$ | 0 | 0 | $\bar{1}$ |

W'

| | 1 | 0 | $\bar{1}$ |
|---|---|---|---|
| 1 | 0 | 1 | 0 |
| 0 | 1 | 0 | $\bar{1}$ |
| $\bar{1}$ | 0 | $\bar{1}$ | 0 |

OPTICAL ARITHMETIC LOGIC USING THE MODIFIED SIGNED-DIGIT REDUNDANT NUMBER REPRESENTATION

STATEMENT OF GOVERNMENT INTEREST

The invention described herein may be manufactured and used by or for the Government of the United States of America for governmental purposes without the payment of any royalties thereon or therefor.

This is a division of application Ser. No. 947,142, filed Dec. 29, 1986, now U.S. Pat. No. 4,838,646.

BACKGROUND OF THE INVENTION

Modern signal, image, and information processing are relying more and more on the use of matrix albebra as a basic computational tool. In addition, many problems require a real-time computational capability. For these reasons, emphasis is currently being placed on the development of dedicated electronic parallel-processing devices using VLSI/VHSIC technology for performing the intensive computations required in numerical matrix algebra. Recent interest of using optical techniques for performing matrix operations is becoming more clearly evident. The innate parallelism, non-interfering communication and wide bandwidth of optical processing systems have successfully demonstrated its strengths in performing convolutions and correlations as well as a variety of linear transform operations. Optical or photonic computing will have significant impact on general matrix computation, provided that new concepts for improving the precision are developed.

One development which has improved the precision of optical computations employs an algorithm for performing multiplications and additions using optical convolving devices. This was the subject matter of a presentation by H. J. Whitehouse et al, entitled "Aspects of Signal Processing with Emphasis on Underwater Acoustics", *Part* 2, *G. Tacconi,* edition, Reidel, Dordrecht, The Netherlands (1977) and D. Psaltis et al, in their article entitled "Accurate Numerical Computation By Optical Convolution", in 1980 *International Optical Computing Conference Book* II. W. T. Rhodes edition, Proc., SPIE 232, 151 (1980). The algorithm identified in these articles has been become popularly known as the digital multiplication by analog convolution (DMAC) algorithm. For the case of radix 2, for example, the DMAC algorithm is novel in that binary numbers may be added without carries if the output is allowed to be represented in a mixed binary format. In the mixed binary format, as in binary arithmetic, each digit is weighted by a power of 2, but unlike binary arithmetic, the value of each digit can be greater than 2. It is the elimination of the need for carries that makes this technique particularly attractive in terms of optical implementation. The DMAC algorithm has been used in optical architectures for performing matrix multiplication involving numbers expressed in fixed-point form. Such applications are documented for example, by the article by W. C. Collins et al entitled "Improved Accuracy for an Optical Iterative Processor," in *Bragg Signal Processing and Output Devices,* B. V. Markevitch and T. Kooij, editors, Proc., SPIE 352, 59, (1983); R. P. Bocker et al in their article entitled, "Electrooptical Matrix Multiplication Using the Twos Complement Arithmetic for Improved Accuracy," *Appl. Opt.* 22, 2019 (1983); by P. S. Guilfoyle, in his article entitled "Systolic Acousto-optic Binary Convolver," *Opt. Engr.* (23)/(1), 20 (1984), and A. P. Goutzoulis, in his article entitled "Systolic Time-Integrating Acoustooptic Binary Processor," *Appl. Opt.* 23, 4095 (1984). A floating-point form of the DMAC algorithm has been expressed in an optical architecture by articles authored by R. P. Bocker et al, see "Optical Matrix-Vector Multiplication Using Floating-Point Arithmetic," in *Optical Computing Technical Digest, TuD*3-1, OSA (1985), and "Optical Fixed-Point Arithmetic," presented at SPIE Conference No. 564, Real Time Signal Processing VIII, W. J. Miceli and K. Bromley, chairmen, San Diego (August 1985).

With respect to the implementation of the DMAC algorithm however, as expressed above, there continues to be one main criticism when it is used in matrix multiplication. This criticism is the need for high-speed electronic analog-to-digital converters, required for converting mixed binary back to pure binary. In addition, the DMAC algorithm does not take full advantage of the intrinsic parallelism of optics.

A second optical technique for improving precision is based on the use of the residue number system. The literature is replete with references to this system, among which is the article by, A. Huang, entitled "The Implementation of a Residue Arithmetic Unit Via Optical and Other Physical Phenomena," *Digest of the International Optical Computing Conference, IEEE Catalog* 75-CH0941-5C, (New York 1975), and A. Huang et al, article entitled "Optical Computation Using Residue Arithmetic," *Applied Optics* 18, 149 (1979), and F. A. Horrigan et al, entitled "Residue-Based Optical Processor," in *Optical Processing Systems,* W. T. Rhodes, editor, Proc., SPIE 185, 19 (1979), to name a few. The residue number system offers the appealing feature of carry-free addition, subtraction, and multiplication, thus making it very attractive for parallel processing. However, the main disadvantages of the residue number system concern the awkwardness of conversion from a residue form to a standard number representation, the difficulty in performing division, and the complexity in determining the correct sign of a subtraction operation.

The modified signed-digit (MSD) number representation has been set forth in the literature as a third approach for improving the precision of optically performed computations. The article by A. Avizienis, entitled "Signed-Digit Number Representations for Fast Parallel Arithmetic," *IRE Trans. Electronic Computers EC*-10, 389 (1961), describes a class of number representations otherwise known as signed-digit representations. This number system offers carry-free addition and subtraction, fixed-point as well as floating-point capability, and the potential for performing divisions optically. However, the paper, while presenting certain logic design problems, did not provide the necessary optical architecture for actually performing such computations.

Thus, there exist in the state-of-the-art the necessary optical architectures to implement the modified signed-digit number representation in addition, subtraction and multiplication, so that fully parallel carry-free operation is provided for with reduced complexity to realize the advantages of optical signal processing.

SUMMARY OF THE INVENTION

The present invention is directed to providing an apparatus and method for optically implementing the arithmetic computations with modified signed-digit numbers represented in trinary form. These computations involve addition, subtraction or multiplication depending on the configuration and arrangement of optical logic modules. The logic modules optionally are implemented in accordance with two schemes including three position optical binary encoding or three state optical polarization encoding. For addition of two trinary digit numbers an array of parallel modules effecting T and W logic functions receive operand trinary digit pairs made up of corresponding operand trinary digits from each number. All trinary digit pairs of the two numbers are simultaneously received and optically processed in parallel to produce simultaneous and parallel optical first transfer and weight digits. A second array of parallel modules for effecting T′ and W′ logic functions, receives the first transfer and weight digits, with the exception of the first transfer and weight digits coming from the left most operand trinary data digits pair and the right most operand trinary data digits pair, to simultaneously and in parallel optically produce second transfer and weight digits that are fed to an interconnected array of T logic function modules. The output of the T modules when taken with the left and right first transfer and weight digits, is a trinary representation of the sum of the trinary numbers. Changing the length of the numbers can be accomodated by merely including redundant T-W and T′-W′ modules, without changing the parallel, simultaneous computation time. Subtraction is performed by changing one of the trinary numbers to its complement via a parallel M logic function array and adding the complement as just described. Multiplication relies upon forming partial products with parallel M and O modules arranged in a partial product generator array and then double adding with T-W and T′-W′ modules. Multiplication is performed by generating partial products with M and O modules, then adding the partial products in pairs with T-W and T′-W′ modules.

An optical three position binary encoding scheme calls for the fabrication of discrete modules associated with each of the logic functions. They may be made up of an (s) component having a diffraction grating or holographic element that distributes input triad beams onto a number of suitably disposed bistable elements. When two input triad beams impinge on the same bistable element, an output beam is transmitted from the element to either a (w), (t), (w′), (t′), (m) or (o) component. Each of these components have a prism array directing beams onto a holographic element which is associated with the logic functions of the W, T, W′, T′, M and O modules referred to above. Within the T, W, T′ and W′ modules, the input triad beams are directed differently, so that output triad beams provide transfer and weight digits that agree with truth tables associated with each of the modules.

An optical three state polarization scheme has parallel coupled modules processing trinary logic signals with a 1 (↑) represented by vertical polarization, a 1̄, ⊗ as a horizontal polarization and a O (no signal) by a no state signal. Discretely connected prisms and optical gates make up a polarization logic module that performs W′, W, T, and T′ module logic functions. Duplicate modules are connected to provide for addition. A half-wave plate is interposed to provide the complement of one trinary number to permit subtraction (addition) and a polarization partial product module for M is included to facilitate multiplication.

An object of the invention is to provide for an optical implementation of the modified signed-digit numbers representation.

Another object of the invention is to provide for an optical implementation of the modified signed-digit number representation using a plurality of basic logic function modules.

Still another object is to provide for photonic computing of the modified signed-digit number representation in which, a plurality of optical outputs are provided simultaneously and in parallel.

Yet still another object is to provide for, optical implementation schemes of the modified signed-digit number representation each having the ability to perform addition, subtraction and multiplication.

Still yet another object is to provide for optical implementation of the MSD number representation, using redundant modules to accomodate different order numbers.

Still another object is to provide for, the multiplication of numbers in the MSD representation by the addition of partial products to arrive at a fully parallel, simultaneous output.

Yet still another object is to provide for optical implementation of logic function modules by the select application of diffraction gratings and bistable elements used in conjunction with appropriately disposed prisms and additional gratings to assure reliable, responsive fully parallel and simultaneous operation.

Still another object is to provide for the optical implementation of logic functions to enable fully parallel simultaneous operation that advantageously incorporates fiber optics and associated optical signal processing components.

Yet a further object is to provide for optical computing implementations of trinary numbers represented by orthogonal polarized beams and the absence of a beam in the design of adders and partial product generators.

Yet another object is to provide for basic trinary logic modules (T, W, T′, W′ and M to optically implement MSD addition, subtraction and multiplication.

These and other objects of the invention will become more readily apparent from the ensuing specification and drawings when taken in conjunction with the appended claims.

DESCRIPTION OF THE PREFERRED EMBODIMENT

Figures 1, 2A:
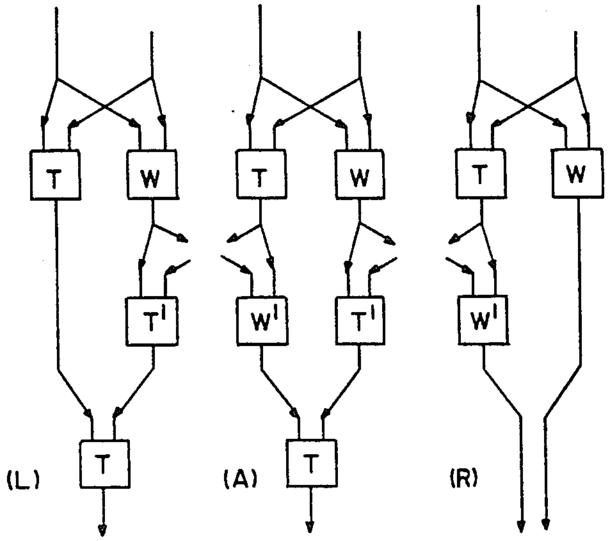
FIG. 1 sets forth the truth tables for trinary logic elements T, W, T′ and W′.
FIG. 2*a* sets forth the L, A and R elements of adder array modular assemblies for MSD addition and subtraction.

The optical implementation advantageously realizes the advantages of the modified signed-digit (MSD) number system. This system is one of a class of redundant number systems, that is, for a given decimal number, more than one representation in the MSD system can be generated. Though, MSD algorithms accept binary inputs, the transformations taken place within the algorithm can yield results outside the set of binary numbers. These MSD numbers have digits from the digit set (−1, 0, and 1).

A more detailed discussion of the MSD representation is setforth in the article identified above by A. Avizienis. Briefly, the MSD representation is a subset of the signed-digit representation, which is a redundant number system of radix greater than two. The signed-digit number has a radix r and digit set, [−a, . . . , −1,0,1, . . . , a]. For a certain choice of r more than one digit set can be generated. A particular r is chosen: such that r/2≦a≦r−1 for even r. and r+1/2≦a≦r−1 for odd r. The MSD number system has r=2 which makes a=1 and gives the digit set $D_{msd}$ equal to ($\bar{1}$, 0, 1). Here it is to be noted that −1 designation is depicted as $\bar{1}$, where $\bar{1}$ is the logical complement of one. This is the only digit set for the MSD number representation.

Each decimal number is represented in the MSD number system by writing down the coefficient of the polynomial $(N)_{10}=[\bar{1},0,1,]2^{P}1+ \ldots +[\bar{1},0,1]2^{1}+[\bar{1},0,1]2^{o}$ where (p) is the number of trinary bits of precision and one of the digits in brackets is selected to give the proper representation. For example, using 4-bit trinary precision for (N)=7 gives: $(7)_{10}=(1)2^{3}+(-1)2^{2}+(1)1^{2}+(1)2^{o}=[1\ \bar{1}\ 1\ 1]$msd, or 7 can be expressed in MSD as:

$$(7)_{10}=(0)2^{3}+(1)2^{2}+(1)2^{1}+(1)2^{o}=[0\ 1\ 1\ 1]_{msd}.$$

The sign information is also carried along with this representation. An MSD negative number is the MSD complement of the MSD positive number. This feature becomes particularly useful in the implementing optical architecture to be discussed below for all that is necessary is to write the complement of one of the numbers and add it to effect its subtraction from the other. For example, using primes to denote complementation [$\bar{1}'$=1, 1'−$\bar{1}$, 0'−0, so that a −7 is expressed as:

$$(-7)_{10}]=[\bar{1}1\ \bar{1}\ \bar{1}]_{msd}.$$

or equivalently, $(-7)_{10}=[0\ \bar{1}\ \bar{1}\ \bar{1}]$

The MSD numbers have digits from the digit set ($\bar{1}$, 0 and 1), carries (borrows) in addition (subtraction) are done implicitly by arranging the transformations on the inputs in such away that cancellation occurs at strategic locations by digits outside the binary set. Any of the MSD digits are allowed to appear in the output as well. The set of tranformations by A. Avizienis in his article cited above, accomplishes this carry (borrow)-free addition (subtraction). To illustrate what is transpiring, an example of integer addition will follow using MSD addition and carry propagation, (standard binary) addition with both having binary inputs. First binary addition:

| | | |
|---|---|---|
| X | 0 1 1 1 | 7 |
| Y | 0 1 0 1 | 5 |
| | 1 1 0 0 | 12 |
| Procedure: | | |
| step 1. | 1 ⊕ 1 = 0— carry 1 | |

-continued

| | |
|---|---|
| step 2. | (carry 1) $\oplus$ 1 $\oplus$ 0 = 0– carry 1 |
| step 3. | (carry 1) $\oplus$ 1 $\oplus$ 1 = 1– carry 1 |
| step 4. | (carry 1) $\oplus$ 0 $\oplus$ 0 = 1 |

Next the binary addition (binary inputs):

| | | | |
|---|---|---|---|
| X | 0 1 1 1 | 7 | |
| Y | 0 1 0 1 | 5 | |
| T | 0 1 1 1 ∅ | | |
| W | ∅ 0 0 $\bar{1}$ 0 | | |
| T' | 0 0 0 ∅ ∅ | | |
| W' | 0 1 1 0 0 | | |
| Z | 0 1 1 0 0 | 12 | (trinary AND of T' & W') |

where the T and T' sums are shifted one to the left and the (Z) sum is a straight trinary add of T' and W' in accordance with the relationship 1+1=1, 0+1=1, 0+1=1, 0+$\bar{1}$, $\bar{1}$ $\bar{1}$+$\bar{1}$=$\bar{1}$, 1+1=0, there is no shift in the (Z) summing process. The desination $\phi$ represents where no operation is performed and is equivalent to zero. Truth tables that correspond to the logic functions of modules, T, W, T' and W' (to be described) are expressed in FIG. 1. The representations for T, W, T' and W' in the MSD example above, can be verified from the truth tables. The procedures for generating the functions from the truth tables in FIG. 1 are:

T, W from X and Y –

| | X Y | |
|---|---|---|
| step 1: | 1 $\oplus$ 1 →$T_1$=1, $W_1$=0 | (compare this with step 1 above) |
| step 2: | 1 $\oplus$ 0 →$T_2$=1, $W_2$=$\bar{1}$ | |
| step 3: | 1 $\oplus$ 1 →$T_3$=1, $W_3$=0 | |
| step 4: | 0 $\oplus$ 0 →$T_4$=0, $W_4$=0 | |

T', W' from T and W –

| | T W |
|---|---|
| step 5: | 1 $\oplus$ 1 →$T'_1$=0, $W'_1$=0 |
| step 6: | 1 $\oplus$ 0 →$T'_2$=0, $W'_2$=1 |
| step 7: | 1 $\oplus$ 0 →$T'_3$=0, $W'_3$=1 |
| step 8: | 0 $\oplus$ 0 →$W'_4$=0 |

In the MSD example above, step 2 yields the proper $W_2$ required to cancel the $T_1$ from step 1, which puts a zero at the correct position in the result. The ability to do symmetric cancellation (1$\oplus\bar{1}$=0) is important to the logic operations in the MSD system; 1 and its complement $\bar{1}$ yield a third 'neutral' digit O.

When a carry would have been generated in binary addition, a symmetric cancellation occurs in MSD addition, obviating the need for the carry. However, it should be noted that carries generated in the most significant trinary bit do not produce this symmetric cancellation. Symmetric cancellation by itself is not sufficient to produce carry-free addition. The transfer of trinary bits to the next most significant position (the generation of T's and T'’s) is actually a partial carry, with superfluous partial carries being annihilated by symmetric cancellation.

The symmetric cancellation and transfers work together in such a way that whenever a carry would have resulted whle using binary addition, and that carry is to be added to 1 and 0 (carry 1)$\oplus$1$\oplus$0), as in step 2 of the above example, a $\bar{1}$ is generated to annihilate the unwanted partial carry, or transfer. A superfluous partial carry can also result when no carry would have been generated in standard binary addition. In this case a MSD number (a number with $\bar{1}$ for some of the digits) is the output though the inputs were binary. To illustrate binary and MSD addition of $(10)_{10}$ and $(8)_{10}$ with binary inputs and MSD outputs for the latter:

| Binary Addition | | | MSD Addition | | |
|---|---|---|---|---|---|
| X | 1 0 1 0 | 10 | X | 1 0 1 0 | 10 |
| Y | 1 0 0 1 | 8 | Y | 1 0 0 0 | 8 |
| | 1 0 0 1 0 | 18 | T | 1 0 1 0 ∅ | |
| | | | W | 0 0 0 $\bar{1}$ 0 | |
| | | | T' | 0 0 0 ∅ ∅ | |
| | | | W' | 1 0 1 1 0 | |
| | | | Z | 1 0 1 $\bar{1}$ 0 | 18 |

Generate T, W from X and Y:

| | X Y |
|---|---|
| Step 1: | 0 $\oplus$ 0→ $T_1$=0,$W_1$=0 |
| Step 2: | 1 $\oplus$ 0→ $T_2$=1(superfluous partial carry), $W_2\bar{1}$ |
| Step 3: | 0 $\oplus$ 0→ $T_3$=0,$W_3$=0 |
| Step 4: | 1 $\oplus$ 1→ $T_4$=1,$W_4$=0 |

Generate T', W' from T and W:

| | T W |
|---|---|
| Step 5: | 0 $\oplus$ 1→$T'_1$=0,$W'_1$=$\bar{1}$ |
| Step 6: | 1 $\oplus$ 0→$T'_2$=0,$W'_2$=1 |
| Step 7: | 0 $\oplus$ 0→$T'_3$=0,$W'_3$=0 |
| Step 8: | 1 $\oplus$ 0→$W'_4$=1 |

Notice that the effect of the 1 in the result is to cancel the unwanted partial carry which was generated in step 2.

With the ability to do carry-free addition, parallel flow of the operands is made possible. This means that for algorithms requiring only addition and multiplication all trinary bits of the output are seen simultaneously when the algorithm terminates.

Figure 3:
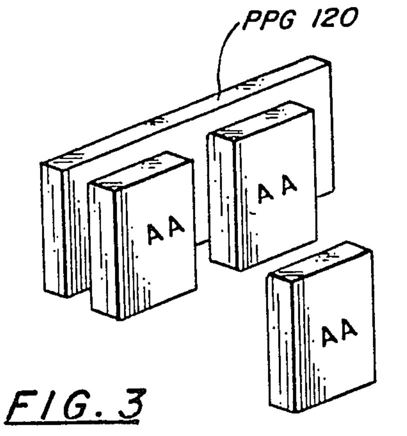
FIG. 3 shows a tree structure for multiplying two, four-digit trinary numbers.

The MSD adder (subtracter with complementation) is a baic building block. Multiplication is achieved by cascading the adders to sum partial products. Cascading the adders for multiplication forms an addition tree where partial products are added in pairs at each level of the tree. The number of levels in the tree depends on the number of trinary digits of precision being used. For a four trinary digit multiplier, there are 2 levels in the tree. This arrangement is schematically depicted in FIG. 3. To illustrate the MSD multiplication $(2)_{10}\times(9)_{10}$:

| | | |
|---|---|---|
| 1 $\bar{1}$ $\bar{1}$ 0 | $(2)_{10}$ | (MSD operands) |
| 1 1 $\bar{1}$ $\bar{1}$ | $(9)_{10}$ | |

(Generate the partial products)

-continued

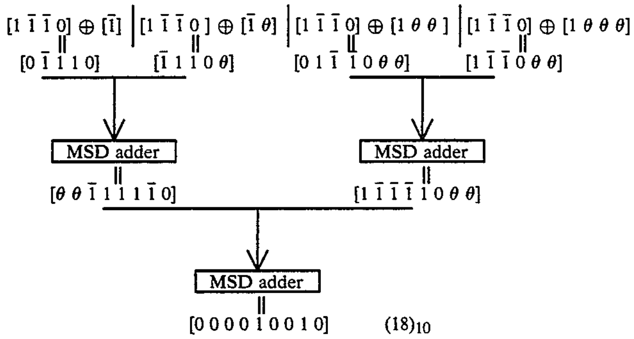

The θ's denote place holders included to normalize the partial products before input to the MSD adders. Since the basic building block of the MSD multiplier is the adder, it too is fully parallel. The partial products flow through their respective branches, in parallel, until the result appears at the root of the adder tree.

The modified signed-digit addition is carried out by performing MSD logic operations on the operand trinary digit pairs to generate the appropriate transfer-and-weight digits. Subtraction requires complementing one of the positive operands and adding it to produce the transfer-and-weight digits. These transfer-and-weight digits are used to generate a second set of transfer-and-weight digits, which are then summed to give the final output. The term transfer-and-weight are used to denote the logic elements or modules T, W, T' and W' to be elaborated on below. These transfer and weight digits are generated as the operands flow through the processing architecture in parallel, making addition of any length operands occur in the same amount of time.

In the MSD number system, two transfer arithmetic is performed on the operands, giving an implicit carry scheme. Demonstration of modified signed-digit addition or subtraction uses an array of basic trinary logic elements or modules appropriately connected together. There are four different of logic elements or modules required in such an array, and are designated by letters T, W, T' and W'. These are fabricated from optical elements to accomplish MSD logic operation in parallel and simultaneously irrespective of the length or magnitude of numbers represented. The trinary logic functions of the modules T, W, T' and W' are setout in the truth tables corresponding to each of these logic modules in FIG. 1.

Figure 2B:
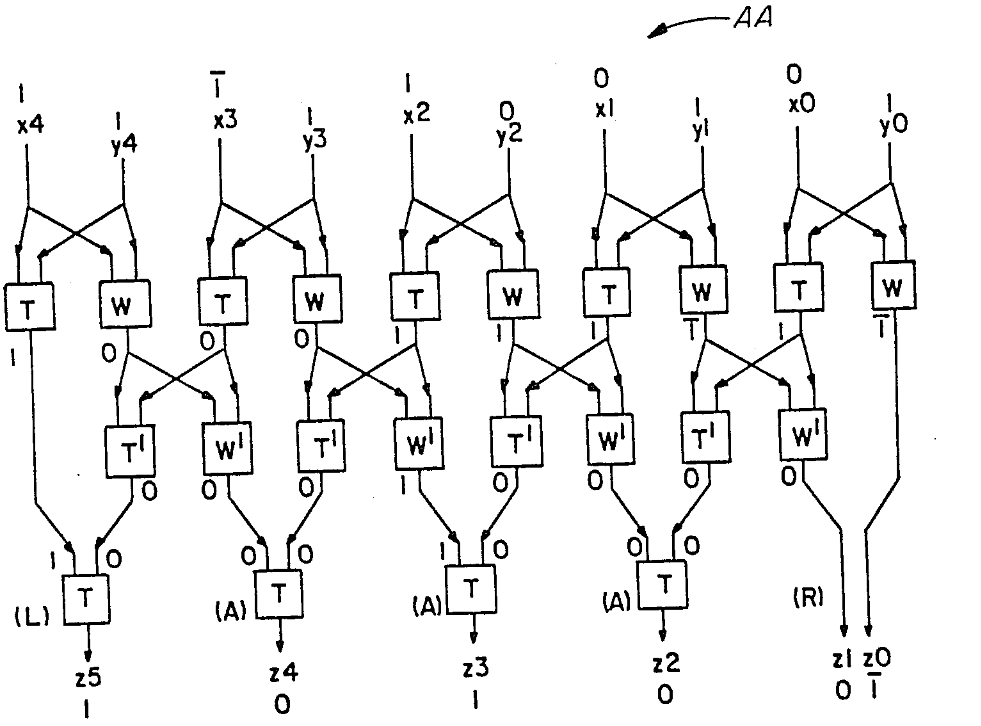
FIG. 2*b* sets forth a typical MSD addition-subtraction array for two 5-digit trinary numbers, digits showing an example of an addition are shown thereon.

The T, W, T' and W' modules are optically coupled together to form three adder elements of array modular assemblies L, A and R see FIG. 2*a*. These, in turn are optically coupled together to create an MSD adder array AA, see FIG. 2*b*. Each adder AA array requires one L (left) assembly, one R (right) assembly, and any number of A assemblies between the L and R assemblies that have their logic elements or modules T, W, T' and W' optically connected together, such as by optical fibers waveguides or other suitable optical means. Any number that can be expressed in trinary form can be accommodated for a fully parallel and simultaneous logic operation, by simply adding the appropriate number of the A assemblies between the L and R assemblies.

Figure 2C:
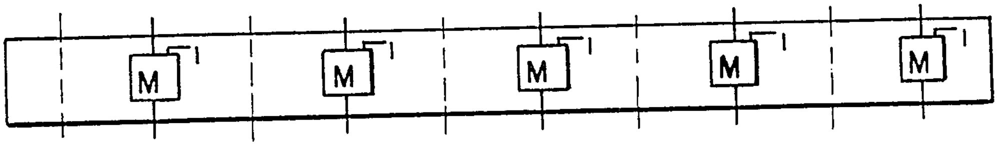
FIG. 2*c* shows complement logic module array used to generate the MSD complement of an MSD positive number to allow the subtraction-addition with the array of FIG. 2*b*.

For example, looking to the MSD adder array of FIG. 2*c*, it is capable of performing addition between two 5-digit trinary numbers [$x_4(2^4)$, $x_3(2^3)$, $x_2(2^2)$, $x(2^1x_0(2^0)$] and [$y_4(2^4)$, $y_3(2^3)$, $y_2(2^2)$, $y_1(2^1)$, $y_0(2^0)$] The output is composed of 6-trinary digits [$z_5(2^5)$, $z_4(2^4)$, $z_3(2^3)$, $z_2(2^2)$, $z_1(2^1)$, $z_0(2^0)$]. This MSD adder array performs the addition of the decimal numbers $(12)_{10}$ and $(27)_{10}$, in accordance with the truth tables in FIG. 1. The decimal number $(12)_{10}$ can be represented in the MSD number system by either of the two 5-digit trinary sequences [01100] [11100]. Similarly, the decimal number $(27)_{10}$ can be represented in the MSD number system by any one of the three 5-digit trinary sequences [11011], [11101] or [11111]. Addition is performed as shown in the examples in the following table:

| |
|---|
| (1) [01100] + [11011] = [101001]=$(39)_{10}$. |
| (2) [01100] + [1110$\bar{1}$] = [1010$\bar{1}$1]=$(39)_{10}$. |
| (3) [01100] + [111$\bar{1}$1] = [10100$\bar{1}$]=$(39)_{10}$. |
| (4) [1$\bar{1}$100] + [11011] = [10100$\bar{1}$]=$(39)_{10}$. |
| (5) [1$\bar{1}$100] + [1110$\bar{1}$] = [1010$\bar{1}$1]=$(39)_{10}$. |
| (6) [1$\bar{1}$100] + [111$\bar{1}$1] = [10100$\bar{1}$]=$(39)_{10}$. |

Referring once again to FIG. 2*b*, example (4) in the table is depicted with its values appropriately inserted at the x and y inputs. The sum [10100$\bar{1}$]=39 is produced.

Suppose however, that 27 were to be subtracted from 12. The decimal number −27 in the MSD number representation is simply the complement of the MSD number associated with positive 27. Thus, −27 is represented by any one of the three 5-digit trinary sequences as [$\bar{1}\bar{1}$0$\bar{1}\bar{1}$], [$\bar{1}\bar{1}\bar{1}$01] or [$\bar{1}\bar{1}\bar{1}$1$\bar{1}$]. Subtraction results are arrived at by referring to the truth tables in accordance with the examples (7) through (12) in the following:

| | |
|---|---|
| (7) | [01100] + [$\bar{1}\bar{1}$0$\bar{1}\bar{1}$]=[$\bar{1}$10001]=$(-15)_{10}$. |
| (8) | [01100] + [$\bar{1}\bar{1}\bar{1}$01]=[$\bar{1}$1001$\bar{1}$]=$(-15)_{10}$. |
| (9) | [01100] + [$\bar{1}\bar{1}\bar{1}$1$\bar{1}$]=[$\bar{1}$10001]=$(-15)_{10}$. |
| (10) | [1$\bar{1}$100] + [$\bar{1}\bar{1}$0$\bar{1}\bar{1}$]=[0$\bar{1}$0001]=$(-15)_{10}$. |
| (11) | [1$\bar{1}$100] + [$\bar{1}\bar{1}\bar{1}$01]=[0$\bar{1}$0011]=$(-15)_{10}$. |
| (12) | [1$\bar{1}$100] + [$\bar{1}\bar{1}\bar{1}$1$\bar{1}$]=[0$\bar{1}$0001]=$(-15)_{10}$. |

The four logic elements or modules T, W, T' and W' are optically implemented to accomplish the logic functions set out in FIG. 1. The examples given which avail themselves of part of present opticl technological development are not be considered as limiting the scope of this invention concept. Modifications of technological improvements are embraced by salient features of this optical implementation. Prismatic arrays, holographic arrays, diffraction gratings, optic bistable array is etc. are in a constant state of evolution. Fiber optic implementation with suitably disposed appropriate couplers and fibers are foreseen as being constantly improved and can be substituted to generate equivalent logic functions as taught herein as it becomes readily apparent to one skilled in this art.

In the optical implementation relying on three position binary encoding, three input triad beams represent the operand trinary digits (1, 0, $\bar{1}$) required in the MSD arithmetic.

Figure 4:
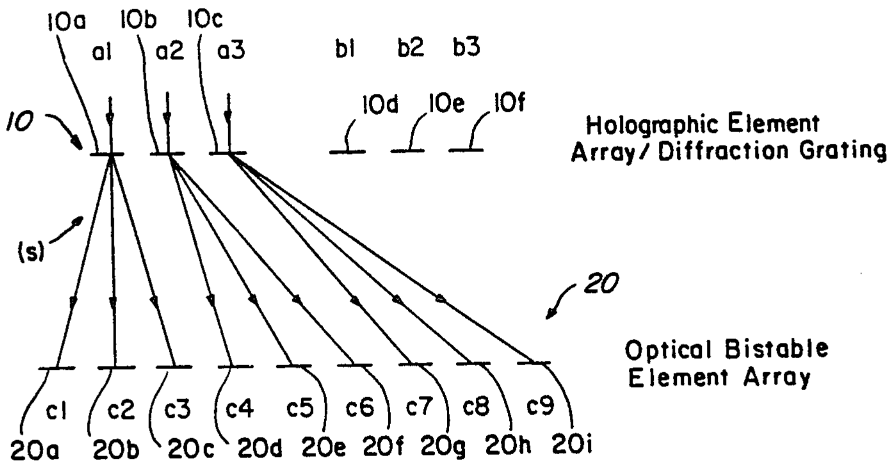
FIG. 4 shows the optical transfer of beams across part of an (s) component with triad beam (a1 a2 a3)=(1 1 1) and triad beams (b1 b2 b3)=(0 0 0), the beam could be directed by optical fibers.
Figure 5:
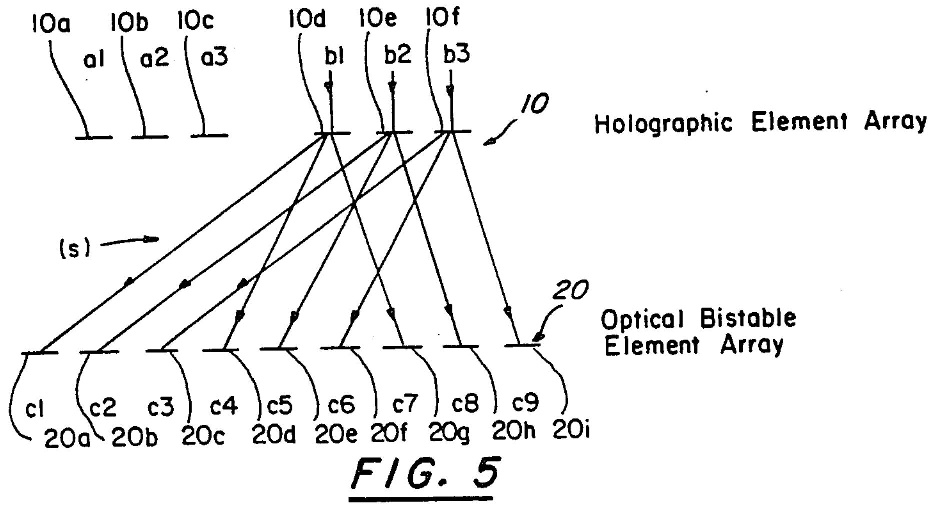
FIG. 5 depicts of component (s) in which the optical triad beams are (a1 a2 a3)=(0 0 0) and (b1 b2 b3)=(1 1 1), the (s) component being an integral part of the logic modules (T, W, T', W', M and O, the beam could be directed by optical fibers.
Figure 6:
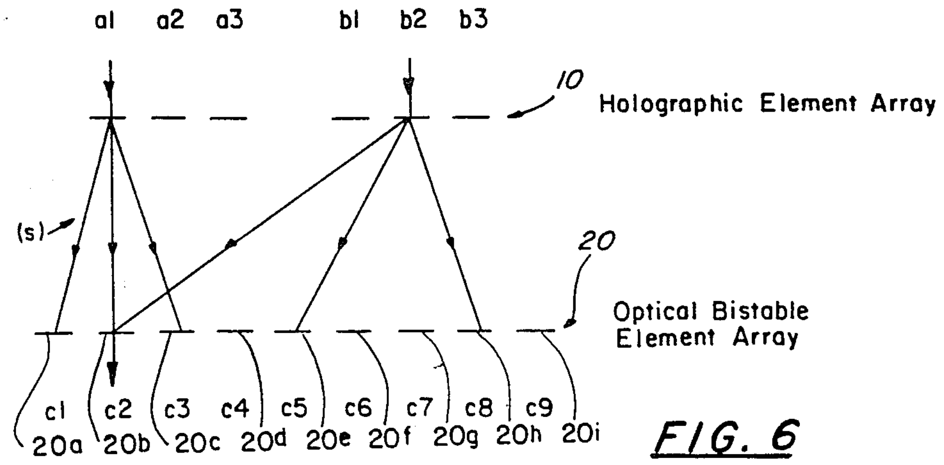
FIG. 6 shows a bistable element c2 in an (s) component providing an output beam upon the coincidence of two input triad beams with (a1 a2 a3)=(1 0 0) and (b1 b2 b3)=(0 1 0).

The basic building block of all of the logic modules T, W, T' and W' (as well as logic modules M an O to be described) is referred to as an (s) component see FIGS. 4, 5 and 6. In FIG. 4 the (s) component has a diffraction grating or holographic element array 10 with three portions thereof, 10*a*, 10*b*, 10*c* at different positions, diffracting an incoming triad of beams a1, a2, a3, onto a bistable element array 20 having nine bistable elements, 20*a*–20*i*. The triad of optical beams denoted by (a1, a2, a3) is separated into nine separate beams of light with one beam impinging on each of the nine bistable elements of optical bistable array 20. Component (s) also has three other portions 10*d*, 10*e*, 10*f*, of the diffraction grating or holgraphic element array 10, receiving three impinging optical beams (b1, b2, b3), see FIG. 5. These portions are also fabricated to direct the beams (b1 b2 b3) into nine beams that impinge on elements 20*a*–*i* of the optical bistable array.

The impinging optical beams a1, a2, a3, and b1, b2, b3, are representative of input triads that as a set of three triads may represent (1, 0, $\bar{1}$).

FIG. 6, depicts a complete (s) component, with input triad beams at a1 and b2, which separated into a total of six beams of light. Two of the six beams arrive at the optical bistable element 20*b*, and the array transmits a light beam c2 at this point caused by the simultaneous inputs from a1, and b2. Since each optical bistable element of the array has the property of tranmitting light if and only when two beams of light impinge on that particular optical bistable element, bistable element 20*b* is the only array element which transmits light. Bistable elements or photo sensitive-light emitter devices are well established in the art that thresholds which transmit or generate light only when a sum threshold is exceeded. Thus, in an array of elements having this property, only the optical bistable element (20*b*) radiates a beam c2 for the input a1, and b2. There are a total of nine different combinations of input triads (a1, a2, a3) and (b1, b2, b3). These combinations are summarized:

| (a1 | a2 | a3) | (b1 | b2 | b3) | (c1 | c2 | c3 | c4 | c5 | c6 | c7 | c8 | c9) |
|---|---|---|---|---|---|---|---|---|---|---|---|---|---|---|
| 1 | 0 | 0 | 1 | 0 | 0 | 1 | 0 | 0 | 0 | 0 | 0 | 0 | 0 | 0 |
| 1 | 0 | 0 | 0 | 1 | 0 | 0 | 1 | 0 | 0 | 0 | 0 | 0 | 0 | 0 |
| 1 | 0 | 0 | 0 | 0 | 1 | 0 | 0 | 1 | 0 | 0 | 0 | 0 | 0 | 0 |
| 0 | 1 | 0 | 1 | 0 | 0 | 0 | 0 | 0 | 1 | 0 | 0 | 0 | 0 | 0 |
| 0 | 1 | 0 | 0 | 1 | 0 | 0 | 0 | 0 | 0 | 1 | 0 | 0 | 0 | 0 |
| 0 | 1 | 0 | 0 | 0 | 1 | 0 | 0 | 0 | 0 | 0 | 1 | 0 | 0 | 0 |
| 0 | 0 | 1 | 1 | 0 | 0 | 0 | 0 | 0 | 0 | 0 | 0 | 1 | 0 | 0 |
| 0 | 0 | 1 | 0 | 1 | 0 | 0 | 0 | 0 | 0 | 0 | 0 | 0 | 1 | 0 |
| 0 | 0 | 1 | 0 | 0 | 1 | 0 | 0 | 0 | 0 | 0 | 0 | 0 | 0 | 1 |

It is to be noted, that a 1 in this table corresponds to the presence of an optical beam and a 0 refers to an optical beam off. (a1, a2, a3=001) indicates that optical beams a1, a2, are off and that beam a3 is on.

The optical encoding scheme for representing the trinary digits +1, 0, −1 is based on associating +1 with (100), 0 with (010), and −1 with (001). For example, in FIG. 6 the two input triads, (a1, a2, a3) equals (100) and (b1, b,2, b3) equals (010), represent the trinary digits +1, 0 respectively.

Figure 7:
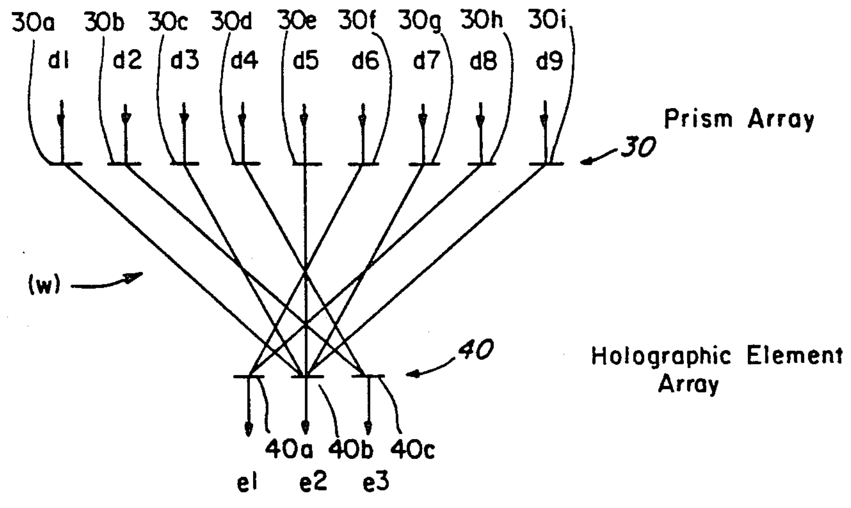
FIG. 7 shows a (w) component used in conjunction with an (s) component to make a (W) logic function module, the beam could be directed by optical fibers.
Figure 8:
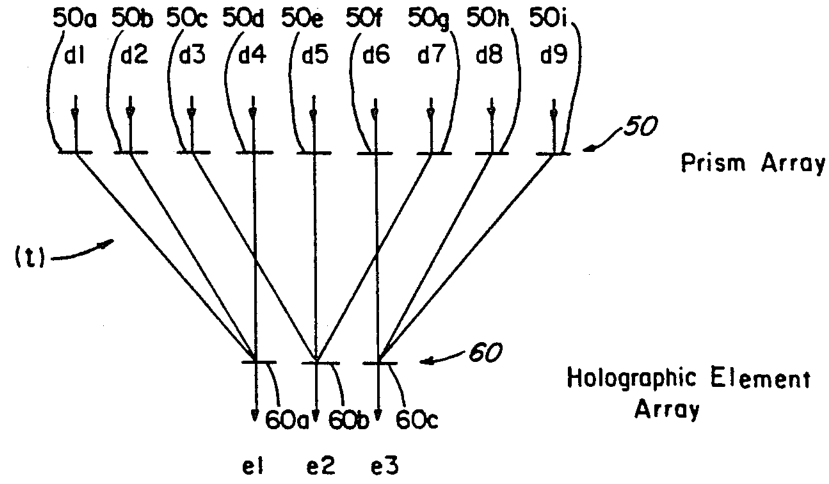
FIG. 8 schematically set for us a (t) component used in conjunction with an (s) component to provide a T logic function module, the beams could be directed by optical fibers.
Figure 9:
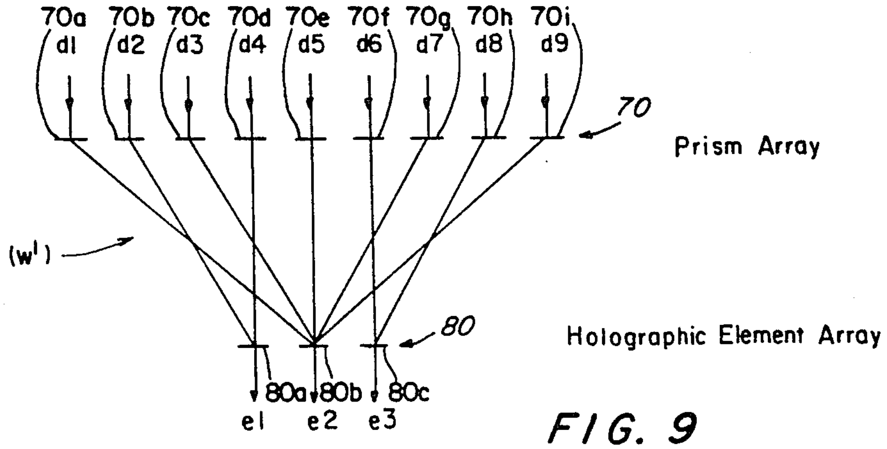
FIG. 9 sets forth a (w') component used in conjunction with an (s) component to provide a W' logic function element or module, the beams could be directed by optical fibers.
Figure 10:
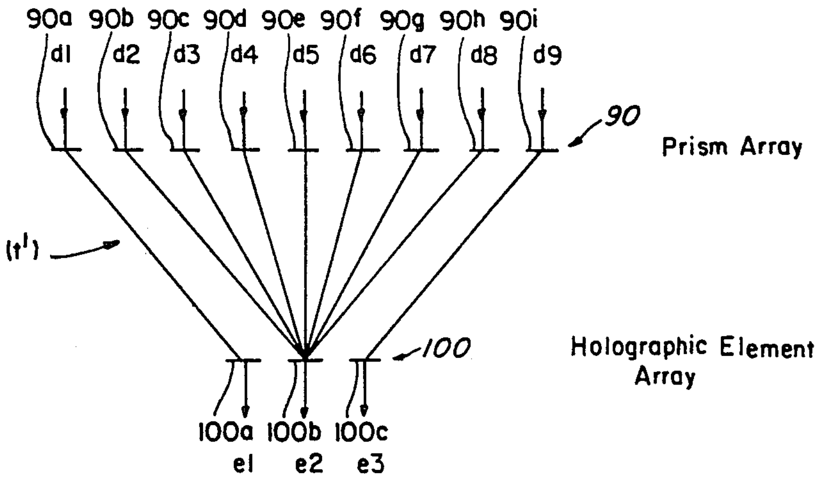
FIG. 10 is a depiction (t') component used in conjunction with an (s) component to provide a T' logic function of a T' logic function module, the beams could be directed by optical fibers.
Figure 13A:
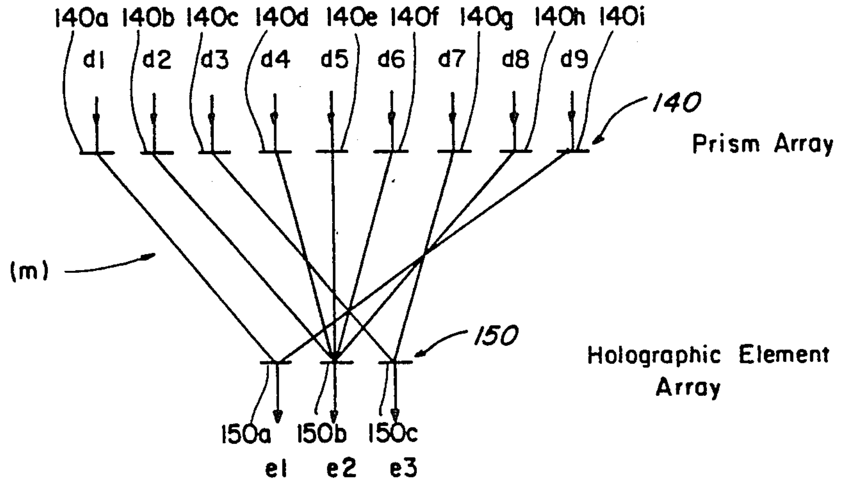
FIG. 13*a* shows an (m) component used in conjunction an (s) component to provide the M logic module function, the beams could be directed by optical fibers.
Figure 13B:
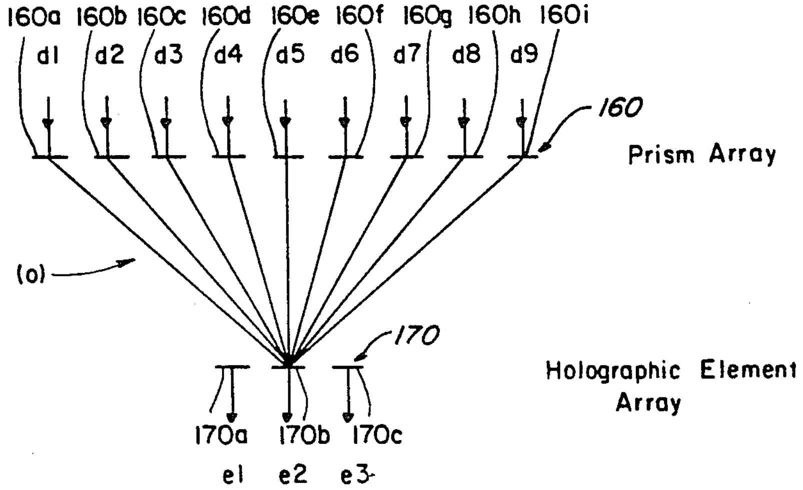
FIG. 13*b* schematically depicts the (o) component that is operatively associated with an (s) component to provide O logic module function, the beams could be directed by optical fibers.

The (s) component optically cooperates with six additional components (w), (t), (w'), (t') (m) and (o). Component (w) is shown in FIG. 7; (t) is shown in FIG. 8; (w') is shown in FIG. 9; (t') is shown in FIG. 10; (m) is shown in FIG. 13*a* and (o) is shown in FIG. 13*b*. All are used with (s) component to form the basic logic modules W, T, W', T', M and O respectively.

Referring to FIG 7, component (w) is made up of a prism array 30 having prism elements or beam parts 30*a*–30*i*, spatially separated to align with the spacing of the optical bistable elements 20*a*–20*i* of a component (s). These pass the incoming beams d1–d9 to appropriate locations or parts 40*a*, 40*b* and 40*c* on a holograph element array or diffraction grating 40. The incoming beams d1–d9 are the same as beams c1–c9 leaving the bistable array 20 of an (s) component from elements 20*a*–20*i*. When a beam impinge on 40*a*, 40*b* or 40*c* transfer-and-weight digit beams are passed or generated therefrom and are designated e1, e2, and e3.

The preestablished angular orientation of the beams from elements or beam parts 30*a*–30*i* of prism array 30 to holographic element array 40 is unique to the (w) modular associated with module W. Each of the other components (t), (w') and (t'), (m) and (o) have their own unique beam orientation structure. This is so to assure the generation of different logic functions associtated with logic modules W, T, W', T', M and O.

Figure 11:
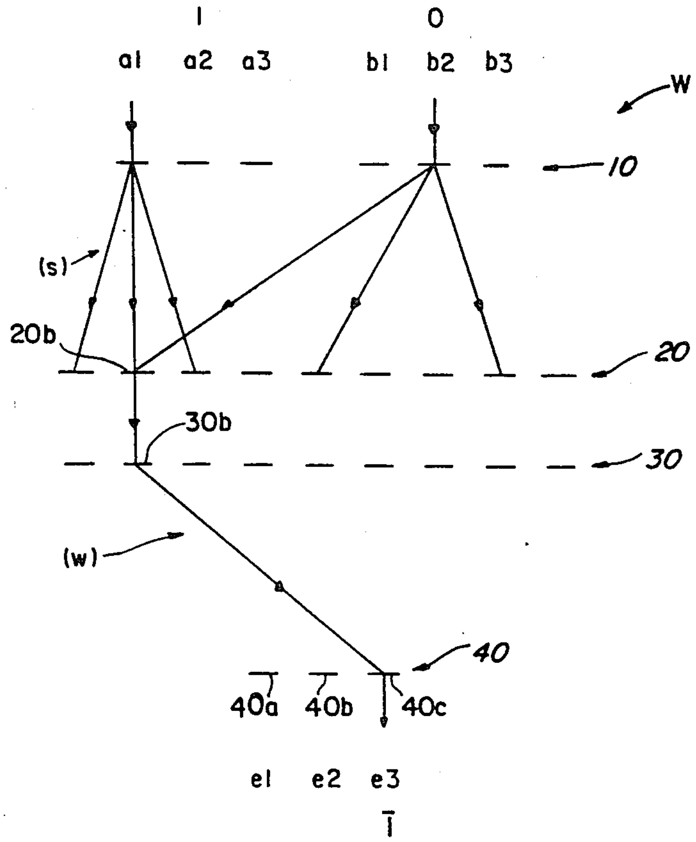
FIG. 11 sets forth the combined (s) component and the (w) component which form a W trinary logic function module W, the beams could be directed by optical fibers.

The trinary logic module W using components (s) and (w) together is shown in FIG. 11. The two input triads ($a_1$, $a_2$, $a_3$) and ($b_1$, $b_2$, $b_3$) give rise to one output triad ($e_1$, $e_2$, $e_3$). For the example illustrated in FIG. 11, the input triads (100) and (010) yield the output triad (001). In terms of trinary logic, the inputs +1 and 0 yield the output −1. The same spatial light modulation encoding scheme works for the other trinary logic elements T, W' and T'. For those logic element components (s) and (t) are used to create a T trinary logic element component (s) ($w^1$) for the W' logic element and component (s) and component ($t^1$) for the T' logic element.

In a component (w) optical beams d6 and d8 are directed onto an element 40*a* of the holographic element array and either assure an output beam e1. Optical beams d1, d3, d5, d7 and d9 are directed to the element 40*b* of the holographic element array and any assure an output beam e2. Beams d2, and d4 are directed to the element 40*c* either of which assure an output beam e3. The three positions correspond to the trinary digits +1, 0 and −1. Only one of the nine optical beams d1–d9 would be on with the remaining 8 off, so that only a single trinary digit would be indicated at the output logic element (w) at any one given time.

The steering of the beams from the elements or beam parts 50*a*–50*i* of prism array 50, to elements 60*a*–60*c* of array 60 of component, (t) accounts for the different logic functions attributed logic module T, see FIG. 8. An impinging beam on any one of the elements 60*a*–60*c* assures an e1, e2, or e3 beam. The different steering of the beams from the elements or beam parts 70*a*–70*i* of prism array 70 to the elements 70*a*–70*c* of holographic or diffraction grating element 80 in component (w') accounts for the different logic functions which is associated with logic module W', see FIG. 9. An impinging beam on any one of the elments *60a–60c* assures e1, e2 or e3 beam. Steering of the beams from the parts *90a–90i* of prism array 90 to the elements *100a–100c* of its associated holographic or diffraction grating 100 in component (t') accounts for the logic functions associated with logic element T', see FIG. 10. An impinging beam on any of the elements *100a–100c* assures an e1, e2 or e3 beam.

The steering of the beams to carry out these logic functions has been attribute to redirection of the beams by preestablished, discreetly configured prism arrays onto appropriately disposed holographic or diffraction element arrays. The proper structural elements are selected and properly placed to properly direct the beams by one skilled in the art to which this invention pertains. Fiber optics with or without couplers can be used to appropriately connect from locations corresponding to (a1 a2 a3) and (b1 b2 b3) to locations corresponding to the location of where beams (c1–c9) emanate. Fibers could also be used to channel beams from the c1–c9 beam locations, to d1–d9 beam locations. Optical fibers can be used to channel the d1–d9 beams from their discrete locations to where beams e1, e2, and e3 emanate from the components (w), (t) (w'), (t'), (m) and (o). The optical logic functions would not be impaired by substituting fibers in place of prisms and holographic arrays and may be desirable in some applications where such optical waveguides have demonstrated a recognized utility, such as in the highly satisfactory ducting of beams in certain microminiture applications. Such modifications are entirely within of the scope of this inventive concept, and become apparent to one skilled in the art to which this invention pertains.

MSD multiplication partially relies on the same algorithm employed for MSD addition, and subtraction. However, adder arrays AA are used repeatedly by summing partial products in tree structure, see FIG. 3. The explicit shifting of operands is avoided conforming more closely with the parallel pipeline flow of data inherent in MSD arithmetic.

Modified signed-digit multiplication between two operands x and y is accomplished by multiplying each trinary digit of the y operand by each trinary digit of the x operand forming the necessary partial products. This procedure has been demonstrated above so that the partial products may be summed in pairs, using the previous described MSD addition algorithm, with appropriate normalization performed by padding with zeros ($\phi$).

Figure 15:
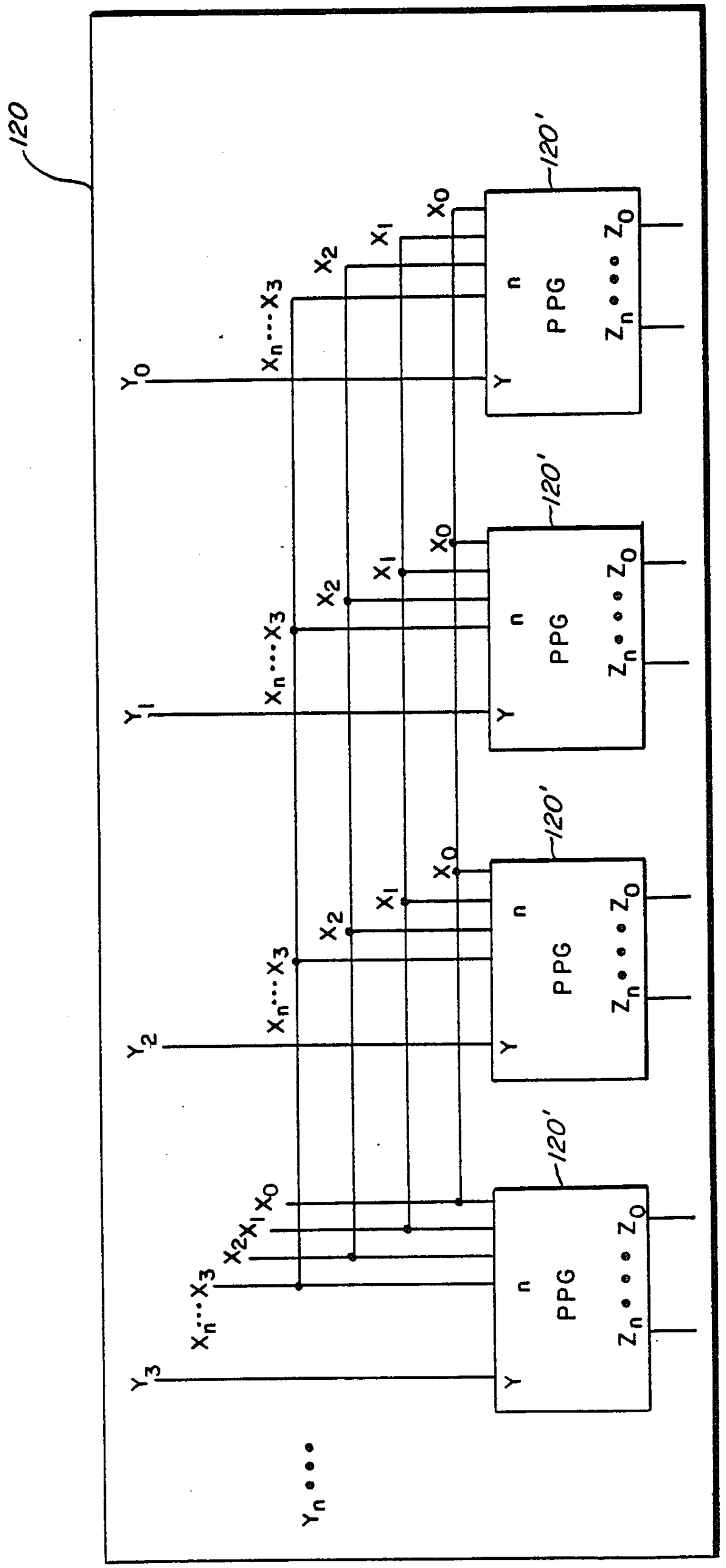
FIG. 15 is a block digram showing a partial product generator array of partial product generator modules.

Generation of the partial product in an optical architecture can be implemented, by a partial product generator 120, see FIG. 15. It is fabricated from a number of appropriately connected partial product generator modules 120' each made up of plurality of logic elements M appropriately coupled together to provide for parallel, simultaneous optical computations on the digits of operands x and y, see FIG. 16.

Figure 12:
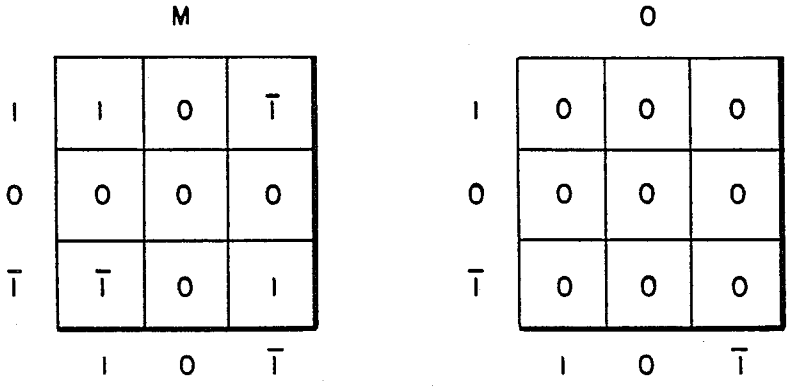
FIG. 12 is a truth table for trinary logic modules M and O.

The optical bistable holographic and prismatic technology referred to above is applicable to the creation of two additional trinary logic modules denoted by M and O for handling the partial products and padded zero respectively. Module M has an (s) component and an (m) component, see FIG. 13*a*. Module O has an (s) component and an (o) component, see FIG. 13*b*. In the embodiment depicted in FIGS. 15 and 16, the logic elements O have been dispensed with although, it is envisioned for some operations that there inclusion may be warranted. Truth tables for the trinary logic elements M and O are set forth FIG. 12, (m) components of 140 beam as shown to parts *150a–150c* of array 150 in FIG. 13*a* and O components of 160 and 170 beam as depicted as shown in FIG. 13*b*.

Figure 14:
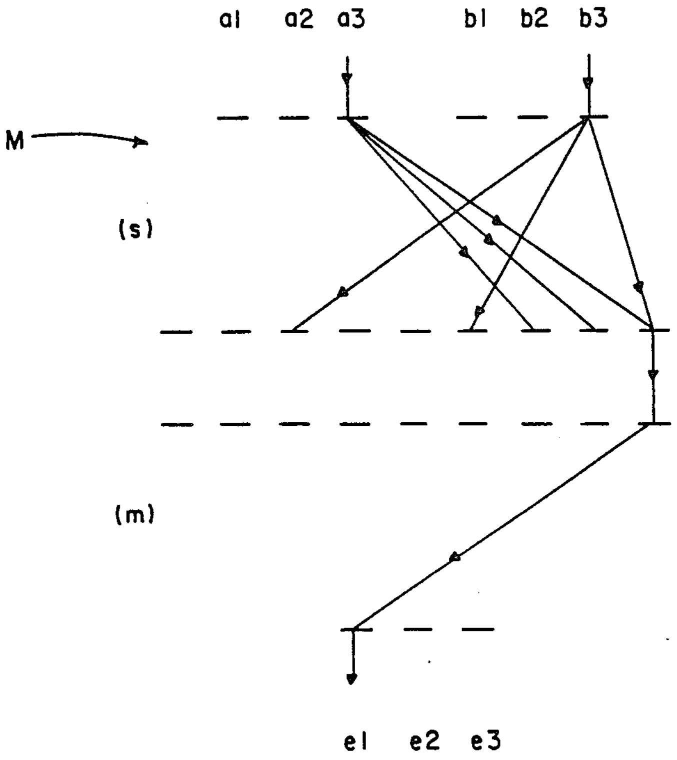
FIG. 14 sets forth an optical trinary logic module M made up of the component(s) and (m) with (a1 a2 a3)=(0 0 1) and (b1 b2 b3)=(0 0 1) to yield (e1 e2 e3) of of (1 0 0).

A completed M logic module as depicted FIG. 14 demonstrates an input triad module ($a_1$, $a_2$, $a_3$)=(001) and input triad ($b_1$, $b_2$, $b_3$)=(001) to yield an output signal triad ($e_1$, $e_2$, $e_3$)=(100). Such an optically interconnected M module functions as a partial product generator module 120', in FIG. 16, as it receives the input triads representative of x and y trinary digits to provide for the partial products for subsequent adding operations.

An M logic element or module such as shown in FIG. 14 also can be used as an "inverter", for arriving at the complement of a trinary number. When either the input triad (a1 a2 a3) or the input triad (b1 b2 b3) has values of (001) (−1) as one input then the other triad (either) (a1 a2 a3) or (b1 b2 b3) can function as the sole trinary input, so that the output at (e1 e2 e3) will be the complement of the inputed trinary bit. It must be remembered however, that an array of parallel M logic modules is optically coupled to receive only one of the trinary digit numbers, so that it may be subtracted. The other input bypasses the "inverter" modules. The M modules coupled as shown in FIG. 2*c* provide this "complementing" function.

Figure 16:
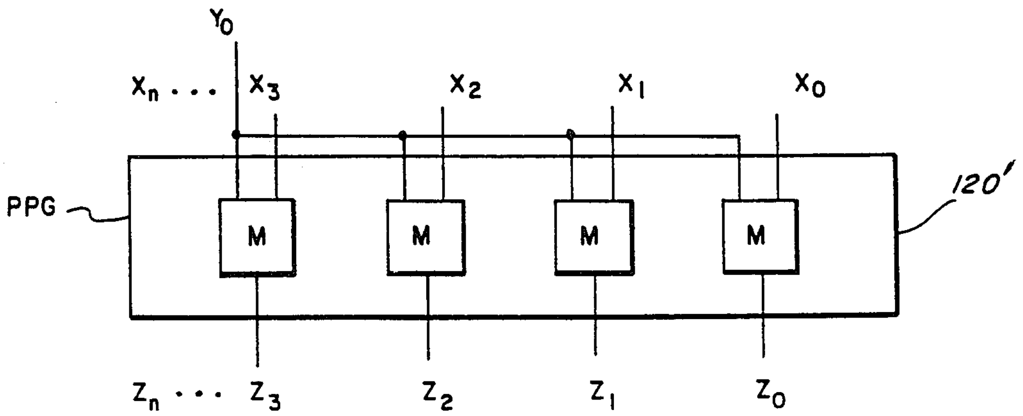
FIG. 16 is a block diagram of a portion of partial product generator module for the trinary digit $y_o$.

The partial product generator module of FIG. 16, is depicted as showing the partial product of the operands ($y_0$) and ($x_0 \ldots x_n$)=($z_0 \ldots z_n$). This same module is duplicated as shown FIG. 15, to accommodate those operands ($y_0 \ldots y_n$) and these ($x_0 \ldots x_n$). The number of partial product generators is of course a function of the digit numbers in the operands and is capable of being duplicated to accommodate larger numbers.

Additions of the partial product continues by additional levels of adder array AA, until the root of the adder tree is reached, see FIG. 3. The adder tree shown is only two tiers of the adder array AA of FIG. 2*b*, with a partial product generator PPG120 of FIG. 16, because only two four trinary digits are being multiplied. This tree is correspondingly increased to have more adder arrays when higher order trinary numbers are multiplied. For example, two 8-digit multiplication would call for another tier and so on.

Figure 17A:
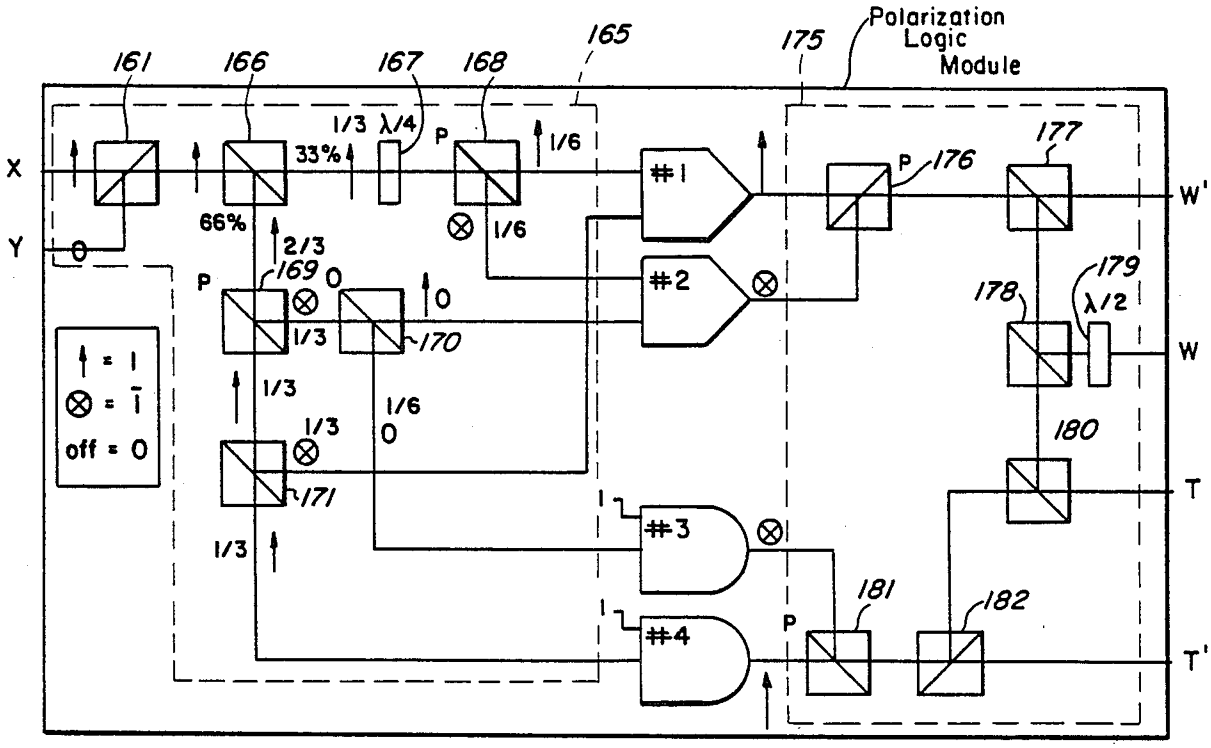
FIG. 17*a* is a schematic representation of a single x and y trinary digit MSD adder module for polarization encoding.

The three-state polarization encoding scheme may rely on the configuration of a module as shown in FIG. 17*a*. This approach exploits the polarization properties of light to encode three logic levels of the MSD number system. With 1 and −1 representing two linear, orthogonal polarization states, with a 0 state represented by the 'off' or dark state, a1 is depicted as a ↑, for vertical polarization and −1 as a ⊗ for horizontal polarization. All four MSD logic element or modules T, W, T' and W' are implemented in the one optical circuit diagram shown in FIG. 17*a*. When only the logic function of one of the truth tables is required, the other truth tables may be blanked off by a designer; however, all four truth table capabilities are inherent in each optical circuit arrangement.

All the interconnections are with fiber optics and the beamsplitters and couplers are 50/50 unless otherwise noted, (a 33% and 66% splitter would split light in $\frac{1}{3}$ and $\frac{2}{3}$ portions). The beamsplitters may be partial mirror structures as suggested by the figures; however, fused fiber optical couplers and the like could be substituted within the scope of this concept. A 'P' denotes a polarizing beamsplitter or coupler.

The 33/66 beamsplitter sets the intensity level for the entire optical circuit. By normalizing the light intensity that enters this beamsplitter as 1, the responses of FIG. 17$b$ are related to the optical signal magnitudes throughout the optical circuit diagram. The relative input intensities for characteristic (a) in FIG. 17$b$ and (b) in FIG. 17$b$ represent the total incident intensity on gates #1, #2, #3 and #4.

Figure 17B:
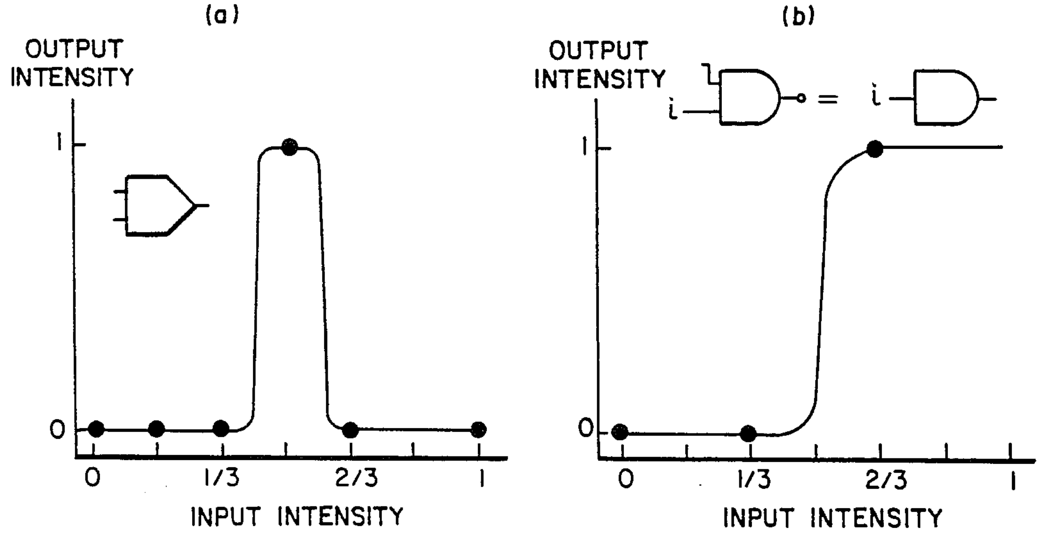
FIG. 17*b* shows response characteristics (a) and (b) for the gates shown in FIG. 17*a.*
Figure 18A:
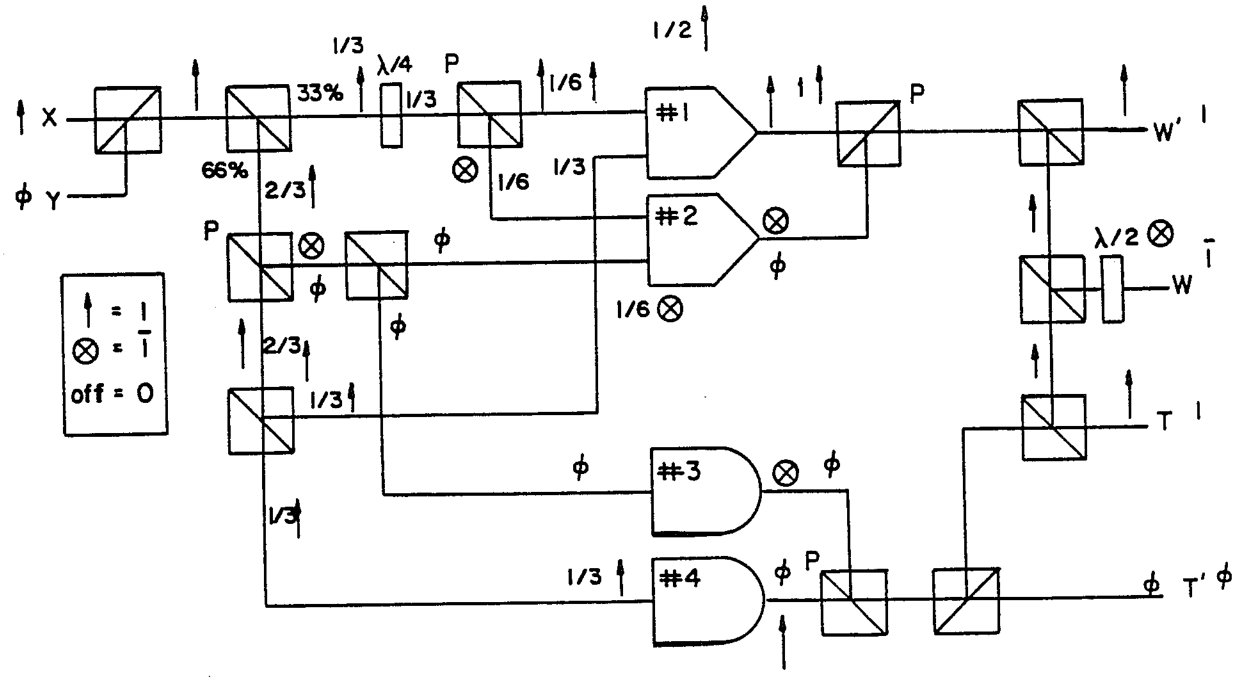
FIG. 18*a* shows the signal magnitude and polarization on the adder module of FIG. 17*a* with x=1 (↑) and y=$\phi$ (no signal).
Figure 18B:
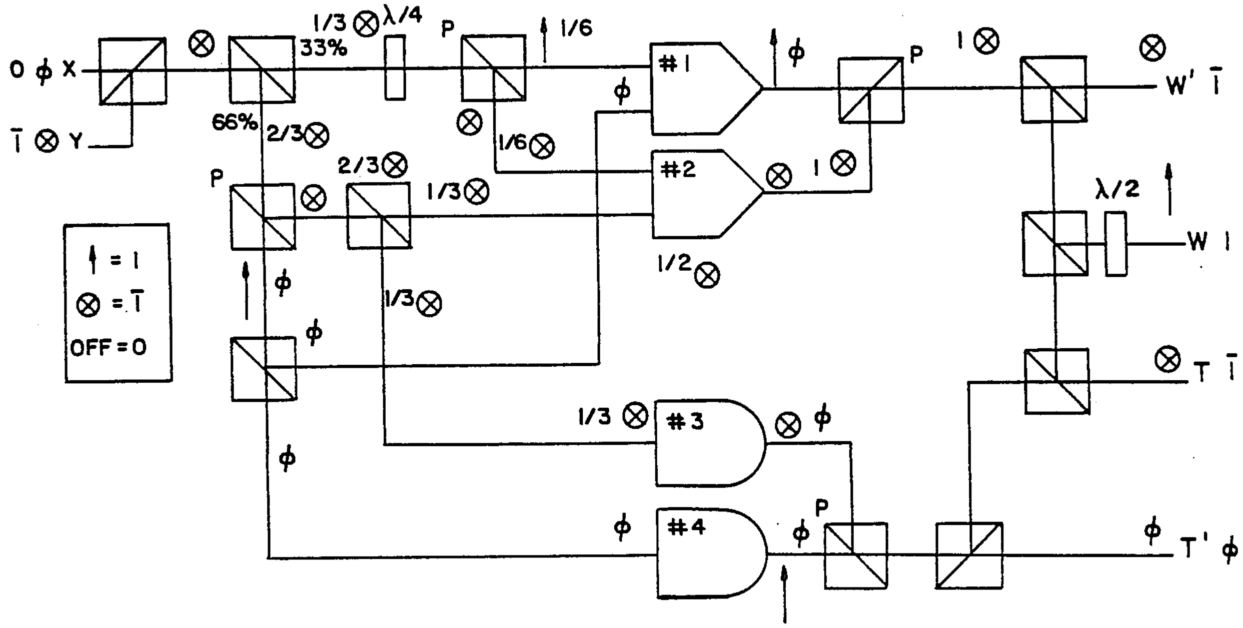
FIG. 18*b* show the signal magnitude and polarization on the adder module of FIG. 17*a* with x=$\phi$ (no signal) and y=1 ⊕
Figure 18C:
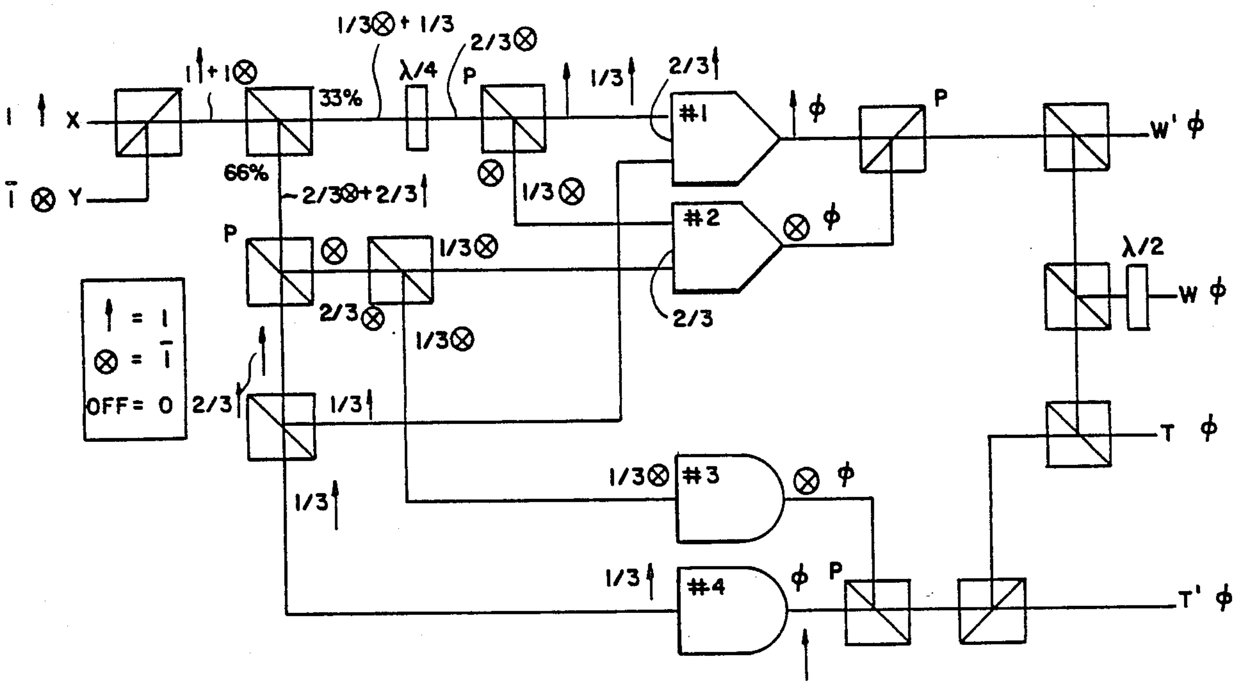
FIG. 18*c* shows the signal magnitude and polarization on the adder module of FIG. 17*a* with x=$\bar{1}$ (↑) and y=$\bar{1}$ ⊗
Figure 18D:
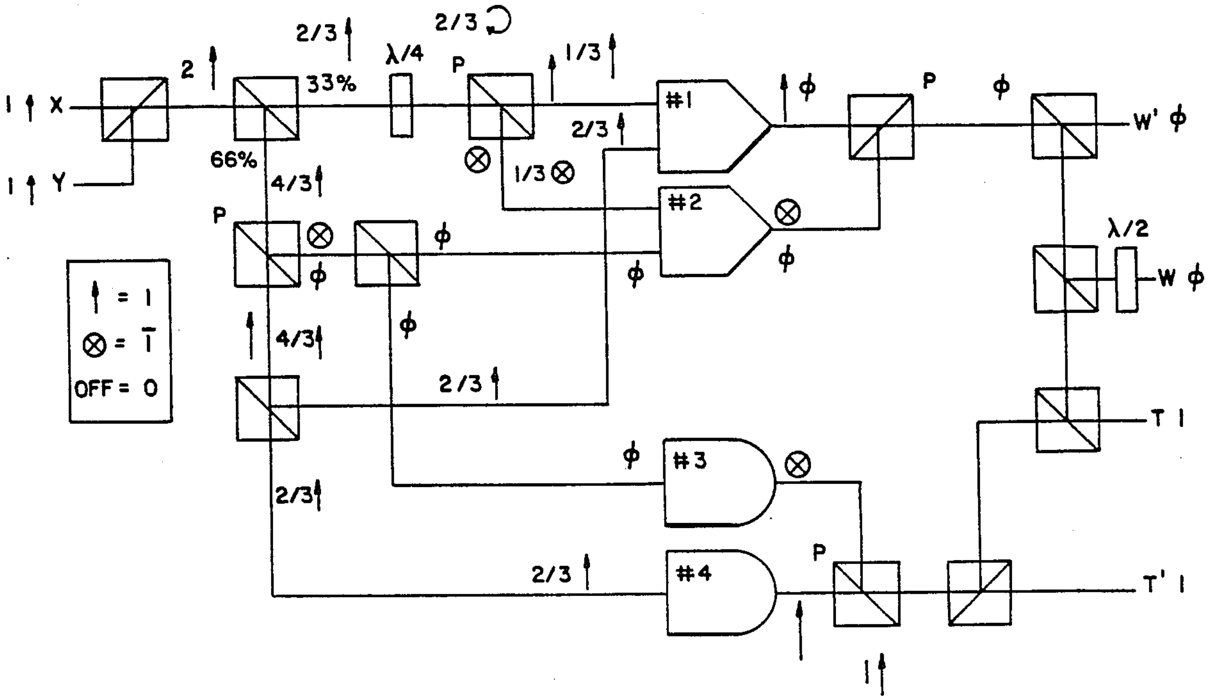
FIG. 18*d* shows the signal magnitude and polarization on the adder module of FIG. 17*a* with x=1 (↑) and y=1 (↑).

The quarter wave-plate ($\lambda/4$) in FIG. 17$a$, is used to circularly polarize the light form the x and y input signals, and then split this polarization, feeding the orthogonal components into the two succeeding logic gates #1 and #2, via appropriate optical fibers. This ensures that the same polarization is incident upon each of these two gates and preserves the output polarization of the two gates. Although, inclusion of the quarter wave-plate has helped the optical circuit to function properly, it may not be needed when different optical gates are selected.

A half wave-plate ($\lambda/2$) is needed to change the W′ output into that of a W, reflecting the fact that these truth tables are actually compliments of one another. How the optical circuit implements the logic functions W, T, T′, W′ is best understood from several examples.

Before going into the examples, specific reference characters along with antecedents for claim nomenclature may be helpful in interpreting the scope of this inventive concept. An initial beamsplitter 161, receives the x and y bit components or feeds them to a first beamsplitter array 165. This array includes a 33/66 beamsplitter 166 that separates the combined x and y signals into sum components. A quarter wave-plate 167 receives the 33% sum component and passes it to a first polarized beamsplitter 168, that passes a first vertical component and a first horizontal component at its outputs. A second polarizing beamsplitter 169, optically coupled to the beamsplitter 166 passes the 66% sum component for separating it into a second vertical component and a second horizontal component. A first 50/50 beamsplitter 170 is optically coupled to pass the second vertical component and (to provide divided first and second vertical components.) A second 50/50 beamsplitter 171 is optically coupled to pass the second horizontal component from the beamsplitter 166 and to provide divided first and second horizontal components.

The optical gates include a first optical gate #1 optically coupled to receive the first vertical component and divided first vertical component to provide an output. A second optical gate #2 optically is coupled to receive the first horizontal component and the divided first horizontal component to provide an output. A third optical gate #3 is optically coupled to receive the divided second horizontal component to provide an output. A fourth optical gate #4 is optically coupled to receive the divide second vertical component to provide an output.

A second beamsplitter array 175 includes a third polarizing beamsplitter 176, optically coupled to receive the output of gate #1 and #2, and pass them to an optically interconnected third 50/50 beamsplitter 177. This gate has a W′ logic function output and a split output optically connected to a fourth 50/50 beamsplitter 178. The fourth 50/50 beamsplitter has a half wave-plate 179 at one of its outputs to provide a W logic function output and an open input to a fifth 50/50 beamsplitter 180 at another output. A fourth polarizing beamsplitter 181 optically is coupled to receive the outputs from gates #3 and #4 and pass them to an optically interconnected sixth 50/50 beamsplitter 182 having a T′ logic function output and a split output. The split output is optically coupled to the open input of the fifth 50/50 beamsplittter 180, that has a T logic function output.

Looking to FIG. 18$a$, the x input trinary digit is a 1 (↑) and y input bit element is a $\phi$ (no signal). After passing through quarter wave-plate $\lambda/4$, and beam splitter, the total contribution from the x input to gate #1 is $\frac{1}{2}$ and the y input contribution is 0, producing a 1 (↑) at the output gate #1, see characteristic (a) of FIG. 17$b$. The total contribution from the x and y inputs to gate #2 is one-sixth from the x input and 0 from the y input, so that there is no output from gate #2. The contributions from the x and y inputs at gate #3 is 0, and gate #4 is only one third, so that both gates produce 0 output. From this point on the outputs from W′, W, T and T′ are seen to be 1, $\bar{1}$, 1, and 0 respectively.

As another example, let the x-input trinary digit be at 0 (no signal) and the y trinary y digit be $\bar{1}$ (⊗), see FIG. 18$b$.

The signal magnitudes and polarizations are as depicted as shown on the FIG. 18$b$, with $\phi$ representing, once again, an 'off' or 'O' state. The output of the W′, W, T and T′ logic functions are $\bar{1}$, 1, 1, $\bar{1}$, 0.

Yet another example is shown in FIG. 18$c$, in which the x trinary digit is a 1 (↑) and the y trinary digit is 1 (⊗), with the magnitudes and polarizations as shown on this figure. The values of W′, W, T and T′ are 0, 0, 0, 0.

Yet another example is shown in FIG. 18$d$, in which both x and y are 1 (↑). This gives the indicated magnitudes and polarizations with values for W′, W, T and T′ at 0, 0, 1, 1.

In all the examples using the same configuration of the common polarization logic modules, the designer has the option to increase the amplification of gates #1, #2, #3, and #4 for simultaneous output of more than one function or the beamsplitters associated with W′, W, T and T′ outputs can be deleted with mirrors selectively added where needed to divide the proper signal magnitudes. In addition, the gates #3 and #4 shown with a single input are in fact two input optical AND gates, with one input coupled to a high state 1. These same gates are used in the M module 104 in FIGS. 19 and 20 to be described below, with both inputs receiving energy.

In the characteristic (a) of FIG. 17$b$ for gates #1 and #2, only one 'on-state' is required and that the input polarization is maintained at the output. Non-linear etalons and interferometric devices may be used here. Typical of such elements which may be selected for this application, is that referred to by J. L. Jewell, et al, in their article "3-pJ, 82 MHz Optical Logic Gates in a Room-Temperature GaAs-AlGaAs Multiple-Quantum-Well Etalon," *Appl. Physics Letters*, Vol 46, NO. 10, pp. 918–920, 1985, and H. Kawaguchi in his article entitled, "Proposal For a New All-Optical Waveguide Functional Device," *Opt. Ltrs.*, Vol. 10, No. 8, pp. 411–413, (1985). The optical AND gate characteristic (b) of FIG. 17$b$ is associated with the gates #3 and #4. One input is at an optically excited state and an optical intensity i on an input is required to drive it. The polarization state is preserved from input to output. There are a number of such devices freely available in the state-of-the-art. Optical AND gates have been developed using bistable/intensity dependent switching effects, such as referred to in the article by, E. Garmire, ed., "Special Issue on Optical Bistability", *IEEE J. of Quantum Electronics, Vol. QE*-21, No. 9, (1985), C. T. Seaton et al, in the article entitled, "Nonlinear Guided Wave Applications", *Opt. Eng., Vol.* 24, No. 4, pp. 593–599, (1985), K. Kitayama et al in their article entitled, "Fiber-Optic Logic Gate", *Appl. Phy. Ltrs.*, 46 (4), pp 317–319, (1985) and W. F. Sarfin et al, in "Room Temperature Optical Bistability in InGaAsP/InP Amplifiers and Implications for Passive Devices", *Appl. Phy. Ltrs.*, 46 (9), pp. 819, (1985).

Figure 19:
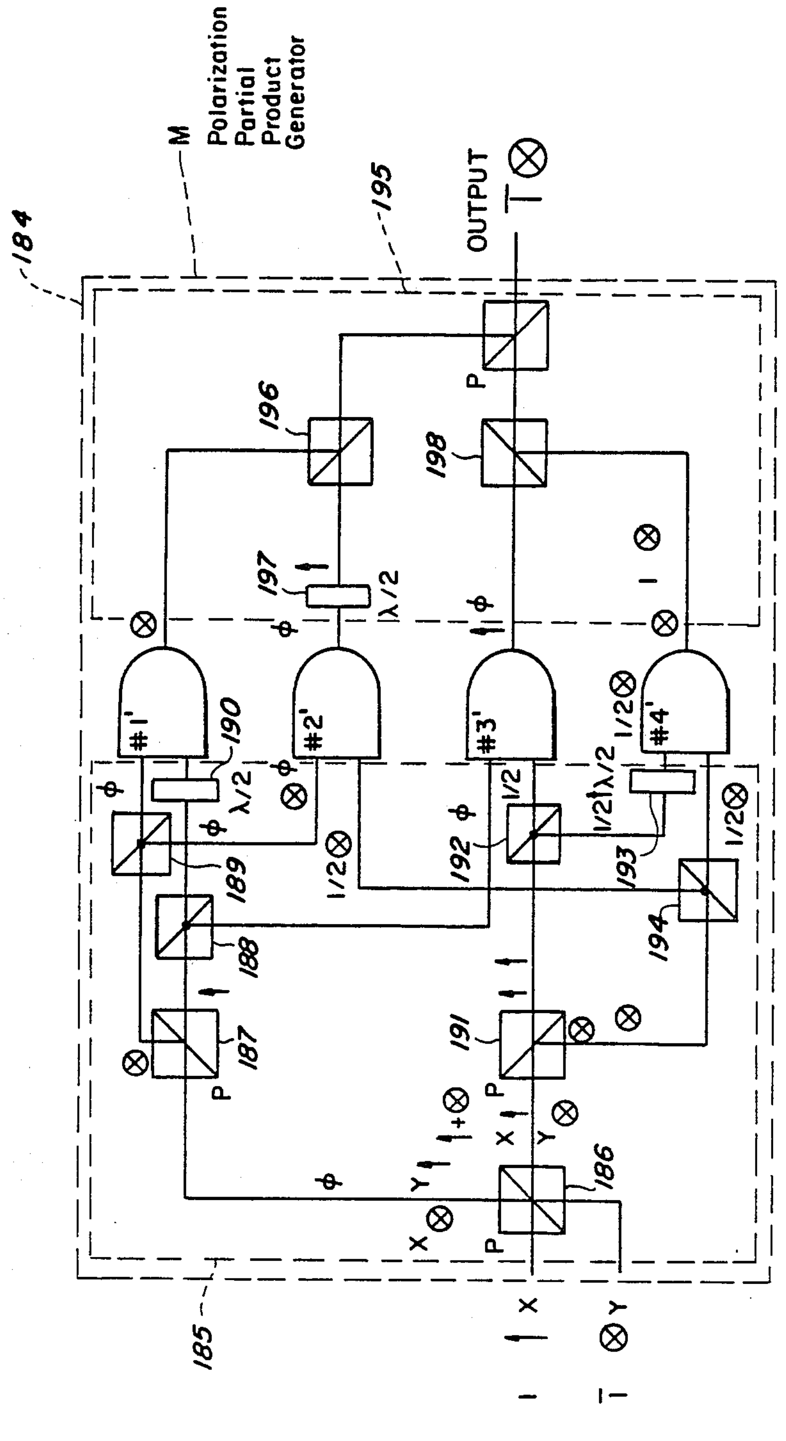
FIG. 19 depicts a single x and y trinary digit partial product generator module using polarization inputs x=1 (↑) and y+$\bar{1}$ ⊗
Figure 20:
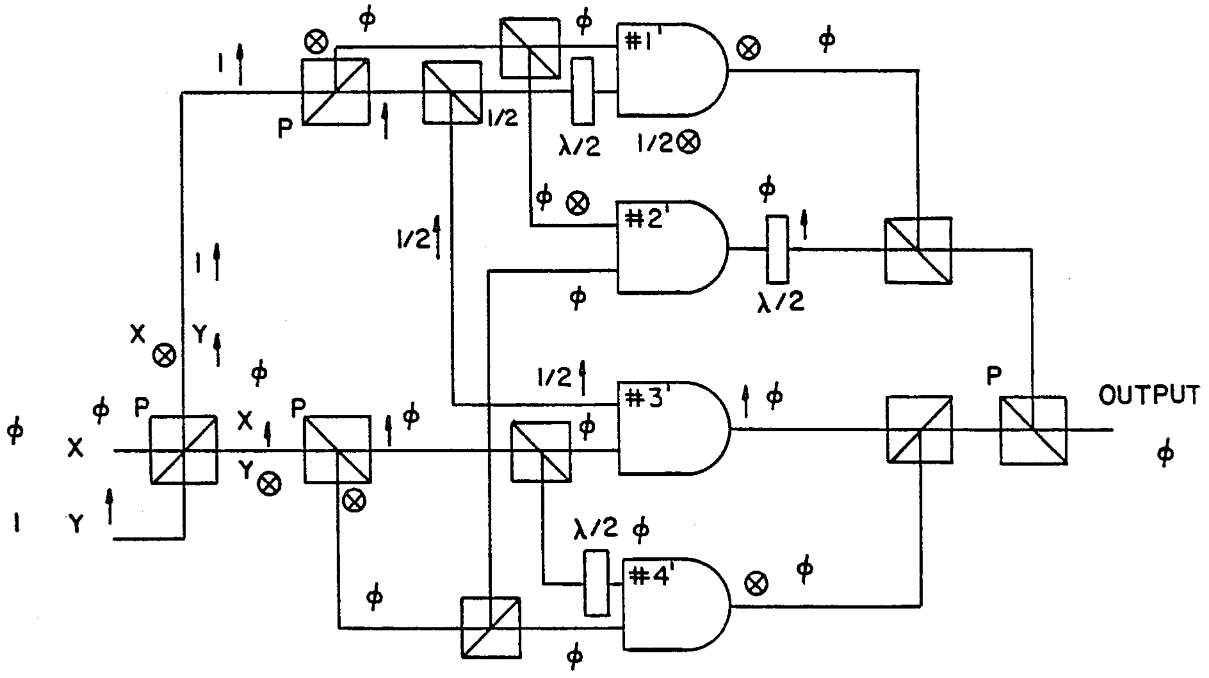
FIG. 20 depicts a single x and y trinary bit partial product generator module using polarization inputs x=0 (no signal) and y=1 (↑).

FIGS. 19 and 20 depict M modules 104 for polarization partial product generators when the three-state polarization architecture is used to implement a multiplier. The module receives an x and y bit with the polarization and signal magnitude as shown in the figures. The 104 modules are duplicated and connected in parallel, as shown in FIGS. *2c*, 15, and 16, to accommodate n-bit operands. These modules are substituted for the M modules in FIGS. 15 and 16 when polarization encoding is selected.

The M logic function module is provided by a partial product polarization encoding module 184. Trinary numbers from inputted bits of one of the trinary digits, are each represented by a vertical polarization triad for one trinary digit, a horizontal polarization triad for another trinary digit or a zero (no signal) triad for the third trinary digit. The partial product polarization encoding module includes a first beamsplitter array 185 optically interconnected to receive the inputted bits. Optical gates #1', #2', #3' and #4' are optically coupled to the first beamsplitter array to provide output signals. A second beamsplitter array 195 is optically coupled to the optical gates to provide responsive output signals representative of M logic function module output signals. The first beamsplitter array, the optical gates and the second beamsplitter array are optically interconnected by optically waveguides.

The first beamsplitter array includes a first polarizing beamsplitter 186, optically coupled to receive the inputted bits and separating them into first and second sum component signals. A second polarizing beamsplitter 187, optically receives the first sum component signal and feeds, primary and secondary components from there, to a first 50/50 beamsplitter 188 having one output going to an optical gate #1' and another output to an optical gate #2' of the optical gates. A second 50/50 beamsplitter 189, having one output feeding a first half wave-plate 190 provide a rotated output for gate #1' and another output feeding the gate #3'. A third polarizing beamsplitter 191 is coupled to optically receive the second sum component, and separates it into primary polarized component and a secondary polarized component. A third 50/50 beamsplitter 192 optically receiving the primary polarized component passes an output thereof, to the gate #3', and another output thereof, to a second half wave-plate 193, that rotates an output and feeds it to gate #4'. A fourth 50/50 beamsplitter 194 is optically coupled to receive the secondary polarized component to feed one output therefrom, to gate #2', and another output therefrom, to gate #4'.

Second beamsplitter array 195 includes a fifth 50/50 beamsplitter 196, coupled to receive an output from gate #1', and an output from gate #2', after it has been rotated by an optically interposed third half wave-plate 197. A sixth 50/50 beamsplitter 198 is coupled to receive an output from gate #3', and an output from gate #4', and a fourth polarizing beamsplitter 199 is optically coupled to the fifth and sixth 50/50 beamsplitters to provide a composite output signal.

Partial product signals are generated noting FIG. 19 when the x digit has a value 1 (↑) and y digit bit of value $\bar{1}$ (⊗). The magnitude and polarization are as depicted throughout the module to arrive at an output value of +1 (↑) or $\bar{1}$ (⊗). In this regard it must be recalled that an M module may function as an "inverter" to effect the complement of a positive number when the other input (y) is maintained at a−1. Such a module M could be used as in FIG. *2c*.

The example of FIG. 20, shows the output of $\phi$ (no signal) when x-input is $\phi$ (no-signal) and y is (1).

Figure 21:
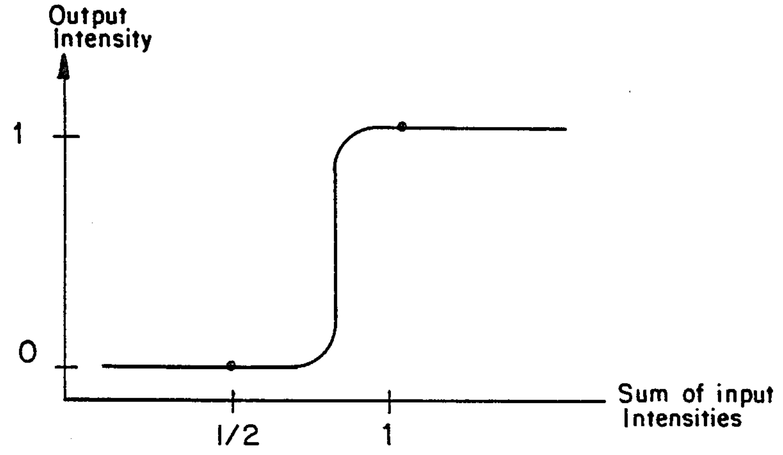
FIG. 21 shows the response characteristic of the adders of FIGS. 19 and 20.

The components in module 104 are polarizing beamsplitters indicated by a 'P' and a 50/50 beamsplitters with half wave-plates $\lambda/2$ and optical AND gates as discussed above. These gates however, are selected from the types discussed in the above cited articles to have a transfer characteristic as shown in FIG. 21.

The disclosed three-state polarization encoding architecture, makes easy the optical implementation of addition by fabricating an adder array as shown in FIG. *2a* and *2b*. Since the architecture of the three-state polarization scheme lends itself to readily reproducibility by modularity via integrated circuit techniques, not all the functions need to be connected or the output beamsplitters can be deleted to assure proper signal strength. Arriving at the complement number of a trinary is easier with the three-state polarization architecture since only a half wave-plate need be interposed between the trinary digits of one of the trinary numbers to effect the complementing of the positive digits. An 'off' will stay an 'off' (its complement) and a 1 (↑) will be rotated to represent a $\bar{1}$ ⊗. The multiplication of trinary numbers will call for the addition of the M modules 104 in the configuration of FIGS. 15 and 16, so that a tree architecture of FIG. 3 will be realized.

Obviously, many modifications and variations of the present invention are possible in the light of the above teachings. It is therefore to be understood that within the scope of the appended claims the invention may be practiced otherwise than as specifically described.

We claim:

1. A polarization encoding module that provides first transfer and weight digits and second transfer and weight digits from T and W logic functions and the T' and W' logic functions respectively from an inputted digit-pair of two trinary numbers, wherein each digit is represented by either a vertically poliarized beam, a horizontally polarized beam, or no signal, said encoding module comprising:

- a first beamsplitter array optically interconnected to receive the inputted digit-pair and
- optical gates optically coupling selective components from the first beamsplitter array, and
- a second beamsplitter array optically connected to the optical gates to output signals representative of output signals from T, W, T' and W' logic function modules.

2. An apparatus according to claim 1 in which the first beamsplitter array, optical gates and second beamsplitter array are optically interconnected by optical waveguides.

3. An apparatus according to claim 2 in which the first beamsplitter array includes:

- a 33/66 beamsplitter receiving the inputted digit-pair and separating them into sum components of 33% and 66%; a quarter wave-plate optically coupled to pass the 33% sum component and feeding it to a first polarized beamsplitter that provides a first vertical component at one output and a first horizontal component at the other output; a second polarized beamsplitter optically coupled to receive the 66% sum component for separating it into a second vertical component and a second horizontal component; a first 50/50 beamsplitter optically coupled to receive the second vertical component and provide divided first and second vertical components; a second 50/50 beamsplitter optically coupled to receive the second horizontal component and to provide divided first and second horizontal components.

4. An apparatus according to claim 3 in which the optical gates includes:

a first optical gate optically coupled to receive the first vertical component and the divided first vertical component to provide an output; a second optical gate optically coupled to receive the first horizontal component and the divided first horizontal component to provide an output; a third optical gate optically coupled to receive the divided second horizontal component to provide an output; and a fourth optical gate optically coupled to receive the divided second vertical component to provide an output.

5. An apparatus according to claim 4 in which the second beamsplitter array includes:

a third polarizing beamsplitter optically coupled to receive the outputs of the first and second gates and pass them to an optically interconnected third 50/50 beamsplitter which provides a W' logic function output and a split output optically connected to a fourth 50/50 beamsplitter, the fourth 50/50 beamsplitter has a half wave-plate at one its outputs to provide a W logic function output, and a fifth 50/50 beamsplitter at another output; a fourth polarizing beamsplitter optically coupled to receive the outputs from the third and fourth gates and pass them to an optically interconnected sixth 50/50 beamsplitter which provides a T' logic function output and a split output optically coupled to said fifth 50/50 beamsplitter which provides a T logic function output.

6. A partial product polarization encoding module to effect the complement of a trinary number, wherein each digit of said trinary number is represented by either a vertically polarized beam, a horizontally polarized beam, or no signal, said encoding module comprising:

a first beamsplitter array optically interconnected to receive an inputted digit the trinary number optical gates optically coupled to the first beamsplitter array to provide output signals and a second beamsplitter array optically coupled to the optical gates to provide responsive output signals representative of an M logic function module output signal.

7. An apparatus according to claim 6 in which the first beamsplitter array, the optical gates and the second beamsplitter array are optically interconnected by optical waveguides.

8. An apparatus according to claim 7 in which the first beamsplitter array and the optical gates include:

a first polarizing beamsplitter optically coupled to receive the inputted digit as well as a steady-state signal condition separating them into first and second sum signals; a second polarizing beamsplitter optically receives the first sum component signal and provides primary and secondary components; a first 50/50 beamsplitter optically receives the primary component and provides one output going to a first gate of the optical gates and another output to a second gate of the optical gates; a second 50/50 beamsplitter optically receives the secondary component and provides one output to a first half wave-plate which provides a rotated input for the first gate, said second 50/50 beamsplitter providing another output to a third gate; a third polarizing beamsplitter coupled to optically receive the second sum component and to separate it into a primary polarized component and a secondary polarized component; a third 50/50 beamsplitter optically receiving the primary polarized component and passing an output therefrom to the third gate, and another output therefrom, to a second half wave-plate which provides a rotated input to a fourth gate; and a fourth 50/50 beamsplitter optically coupled to receive the secondary polarized component to provide one output therefrom, to the second gate and another output therefrom, to the fourth gate.

9. An apparatus according to claim 8 in which the second beamsplitter array includes:

a fifth 50/50 beamsplitter coupled to receive an output from the first gate and an output from the second gate after it has been rotated by an optically interposed third half wave plate; a sixth 50/50 beamsplitter coupled to receive an output from the third gate and an output from the fourth gate; and a fourth polarizing beamsplitter optically coupled to receive the outputs of the fifth and sixth 50/50 beamsplitters to provide a composite output signal.

10. An apparatus for optically implementing the arithmetic processing of the digits of two trinary numbers each trinay number being represented in modified signed digit number representations comprising:

means optically coupled to receive the two trinary numbers for optically generating partial products of both trinary numbers a plurality of optical adder array assemblies each coupled to receive a pair of partial products to optically create composite trinary output signals therefrom; and means optically coupled to receive the composite trinary output signals from the plurality of optical adder array assemblies for optically adding the composite outputs together to provide a product trinary output signal, each optical adder array assembly is fabricated to include:

means optically receiving a pair of partial products of both trinary numbers for optically providing first transfer and weight digits in accordance with T and W truth table logic functions on digit-pairs made up of corresponding digits in each trinary number, all digit-pairs of the two trinary numbers being simultaneously received and being optically processed in parallel to produce simultaneous and parallel optical first transfer and weight digits;

means optically receiving the first transfer and weight digits from said optically providing means except for a left most pair of first transfer and weight digits and a right most pair of first transfer and weight digits for optically generating second transfer and weight digits in accordance with T' and W' truth table logic functions, the first transfer and weight digits being optically operated on simultaneously and in parallel to generate the second transfer and weight digits; and means optically receiving one digit of said left most pair of the first transfer and weight digits from said optically providing means for optically producing a left most second transfer digit in accordance with a T' truth table logic function, said one digit of said left most pair of the first transfer and weight digits being optically operated on simultaneously and in parallel with the other first transfer and weight digits to provide said left most second transfer digit;

means optically receiving one digit of said right most pair of the first transfer and weight digits from said optically providing means for optically enabling a right most second weight digit in accordance with a W' truth table logic function, said one digit of said right most pair of the first transfer and weight digits being optically operated on simultaneously and in parallel with the other first transfer and weight digits to enable said right most second weight digit; and means optically coupled to receive said second transfer and weight digits, the other digit of said left most pair of the first transfer and weight digits and said left most second transfer digit for optically combining thereof in accordance with T truth table logic functions and to optically combine these digits simultaneously and in parallel with the other digit of said right most pair of the first transfer and weight digits and said right most second weight digit, which together form a composite trinary output signal;

and each composite output optical adding means is fabricated to include:

means optically receiving the composite trinary output signals for optically providing third transfer and weight digits in accordance with T and W truth table logic functions on digit-pairs made up of corresponding digits in each composite trinary output signal, all digit-pairs of the two composite trinary output signals being simultaneously received and being optically processed in parallel to produce simultaneous and parallel optical third transfer and weight digits;

means optically receiving the third transfer and weight digits from said optically providing means except for a left most pair of third transfer and weight digits and a right most pair of third transfer and weight digits for optically generating fourth transfer and weight digits in accordance with T' and W' truth table logic functions, the third transfer and weight digits being optically operated on simultaneously and in parallel to generate the fourth transfer and weight digits; and means optically receiving one digit of said left most pair of the third transfer and weight digits from said optically providing means for optically producing a left most fourth transfer digit in accordance with a T' truth table logic function, said one digit of said left most pair of the third transfer and weight digits being optically operated on simultaneously and in parallel with the other third transfer and weight digits to provide said left most fourth transfer digit;

means optically receiving one digit of said right most pair of the third transfer and weight digits from said optically providing means for optically enabling a right most fourth weight digit in accordance with a W' truth table logic function, said one digit of said right most pair of the third transfer and weight digits being optically operated on simultaneously and in parallel with the other third transfer and weight digits to enable said right most fourth weight digit; and means optically coupled to receive said fourth transfer and weight digits, the other digit of said left most pair of the third transfer and weight digits and said left most fourth transfer digit for optically combining thereof in accordance with T truth table logic functions and to optically combine these digits simultaneously and in parallel with the other digit of said right most pair of the third transfer and weight digits and said right most fourth weight digit, which together form a product trinary output signal; said optically providing means in each optical adder array assembly and composite output optical adder means includes a plurality of optically interconnected T logic function modules and a plurality of optically interconnected W logic function modules, said optically generating means includes a plurality of optically interconnected T' logic function modules and a plurality of optically interconnected W' logic function modules to be extended in number to accommodate different magnitudes of trinary numbers and trinary output signals respectively and said optically producing means includes one optically interconnected T' logic function module, said optically enabling means includes one optically interconnected W' logic function module and said optically combining means includes at least one T logic function module and the trinary numbers and trinary output signals are represented by three possible conditions, a vertical polarization condition, a horizontal polarization condition and a zero (no signal) condition.

* * * * *